US005461450A

United States Patent [19]

Long et al.

[11] Patent Number: 5,461,450

[45] Date of Patent: Oct. 24, 1995

[54] APPARATUS AND METHOD FOR TRANSPORTING AND PERFORATING ENLONGATED STRIPS OF MATERIAL

[75] Inventors: Michael Long, Rochester; Frank Castrignano, Fairport; David H. Lancy, Rochester; William C. Lebbon, Rochester; Allen R. Lentz, Rochester; David M. Orlicki, Rochester; Thomas W. Palone, Rochester; Robert C. Raduns, Webster; Joseph E. Stagnitto, Rochester, all of N.Y.

[73] Assignee: Eastman Kodak Company, Rochester, N.Y.

[21] Appl. No.: 319,905

[22] Filed: Oct. 7, 1994

Related U.S. Application Data

[63] Continuation of Ser. No. 45,331, Apr. 8, 1993, abandoned.

[51] Int. Cl.$^{6}$ .............................. B26D 7/18; G03B 13/10

[52] U.S. Cl. .............................. 354/354; 83/100; 83/214; 83/278; 83/365; 242/331.2

[58] Field of Search .................................... 354/319–321, 354/354; 83/571, 100, 365, 271, 278, 402, 409, 548; 242/331.2; 226/45, 97

[56] References Cited

U.S. PATENT DOCUMENTS

| | | | |
|---|---|---|---|
| 2,695,668 | 11/1954 | Roth | 164/89 |
| 2,950,067 | 8/1960 | Keith | 242/18 |
| 3,054,569 | 9/1962 | Weber et al. | 242/45 |
| 3,093,330 | 6/1963 | Schmidt | 242/45 |
| 3,148,816 | 9/1964 | Martin et al. | 226/95 |
| 3,177,749 | 4/1965 | Best et al. | 83/208 |
| 3,254,854 | 6/1966 | Deighton | 242/55.12 |
| 3,465,938 | 9/1969 | McCammon et al. | 226/88 |
| 3,490,672 | 1/1970 | Fisher et al. | 226/188 |
| 3,499,614 | 3/1970 | Badum | 242/182 |
| 3,528,622 | 9/1970 | Schmidt | 242/47.01 |
| 3,643,890 | 2/1972 | Milligan | 242/182 |
| 3,757,619 | 9/1973 | Gianese | 83/65 |
| 3,892,007 | 7/1975 | Pembroke | 15/306 A |
| 3,893,167 | 7/1975 | Stahler | 360/17 |
| 3,937,421 | 2/1976 | Fender et al. | 242/182 |
| 3,944,134 | 3/1976 | Frappe | 234/111 |
| 3,958,777 | 5/1976 | Gervais et al. | 242/182 |
| 4,013,216 | 3/1977 | Smith | 234/34 |
| 4,019,694 | 4/1977 | Fare et al. | 242/182 |
| 4,110,758 | 8/1978 | Nelson et al. | 346/74.1 |
| 4,176,382 | 11/1979 | Froehlich et al. | 360/95 |
| 4,187,997 | 2/1980 | Mosciatti et al. | 242/182 |
| 4,397,532 | 8/1983 | Webb | 242/56.8 |
| 4,480,782 | 11/1984 | Morishima | 83/571 |
| 4,503,741 | 3/1985 | Hunter et al. | 83/549 |
| 4,506,824 | 3/1985 | Bartz | 83/214 X |
| 4,623,089 | 11/1986 | Scott | 234/114 |
| 4,629,919 | 12/1986 | Merkle | 310/90 |

(List continued on next page.)

FOREIGN PATENT DOCUMENTS

| | | |
|---|---|---|
| 329172 | 8/1989 | European Pat. Off. . |
| 605802 | 7/1994 | European Pat. Off. . |
| 404913 | 12/1909 | France . |
| WO92/5467 | 4/1992 | WIPO . |
| WO92/18900 | 10/1992 | WIPO . |

OTHER PUBLICATIONS

Brushless D.C. Motors and Servo Amplifiers, Inland Motors, Kollmorgen Corporation.

*Primary Examiner*—D. Rutledge
*Attorney, Agent, or Firm*—Charles E. Snee, III

[57] ABSTRACT

A web (14) of material such as photographic film is supplied continuously from a stock roll (16) into an infeed vacuum box (24) from which the web passes into an intermittently operated perforator apparatus (30) through which the web is drawn intermittently by a high performance vacuum drum (32) which feeds the web into an outfeed vacuum box (34) from which the web passes continuously to a rewind stock roll (44) or to other intermittently operated processing apparatus. Various patterns of widely spaced perforations and leader/trailer sections may be provided in the stationary web, which moves at high web speeds and accelerations between operations of the perforator apparatus.

31 Claims, 19 Drawing Sheets

U.S. PATENT DOCUMENTS

| | | | |
|---|---|---|---|
| 4,635,365 | 1/1987 | Hashimoto et al. | 33/189 |
| 4,685,613 | 8/1987 | Schambre | 234/131 |
| 4,821,614 | 4/1989 | Fleet et al. | 83/100 |
| 4,860,037 | 8/1989 | Harvey | 354/21 |
| 4,863,550 | 9/1989 | Matsuo et al. | 83/364 |
| 4,889,269 | 12/1989 | Long et al. | 226/97 |
| 4,928,562 | 5/1990 | Tanimura et al. | 83/278 |
| 5,031,431 | 7/1991 | Naito | 364/474.04 |
| 5,074,539 | 12/1991 | Wells et al. | 271/12 |
| 5,079,569 | 1/1992 | Bunch, Jr. | 346/136 |
| 5,106,017 | 4/1992 | Hicks | 234/1 |

APPARATUS AND METHOD FOR TRANSPORTING AND PERFORATING ENLONGATED STRIPS OF MATERIAL

This is a Continuation of U.S. application Ser. No. 045,331, filed 08 Apr. 1993, abandoned.

TECHNICAL FIELD

The invention is related to apparatus and methods for transporting and perforating elongated strips of material. More particularly, the invention concerns such apparatus and methods which are adapted for selectively producing a variety of patterns of perforations along the length of such strips by intermittently feeding a strip and selectively actuating a plurality of punch and die sets positioned along the path of movement of the strip, so as to produce such patterns on strips of different lengths.

BACKGROUND ART

In a variety of applications, elongated webs or strips of material are provided with edge perforations which are used subsequently to drive or guide the strips through other apparatus. For example, photographic film strips for personal cameras have long been provided with a continuous row of evenly, closely spaced perforations along both edges of the strips, the perforations being used during spooling of the strips, during winding of the film through the camera and during processing of the exposed film strips. Similarly, numerous paper products are known in which continuous rows of evenly, closely spaced perforations are provided along the edges of the paper for use in feeding the paper through a processing apparatus such as a printer. Apparatus and methods for producing such continuous rows of evenly, closely spaced perforations are known, some requiring the use of sets of punches and dies which are actuated simultaneously as the strip is intermittently stopped for perforating; and some requiring the use of rotating drums with punches which perforate the continuously moving strip. The strip is then cut into shorter strips each having continuous patterns of perforations, such as strips for various numbers of exposures in the case of photographic film products.

Applications for photographic film strips and similar strip products have been developed in recent years for which the familiar continuous rows of evenly, closely spaced perforations are no longer needed, though other, even patterns of widely spaced perforations are still required to indicate position along the strip or to indicate the lead or tail end of the strip and the like. See, for example, commonly assigned U.S. Pat. No. 4,860,037. Because the perforations are widely spaced and groups of perforations are separated by leader/trailer sections having no or few perforations, known apparatus of the type previously mentioned are not suitable. In the known intermittently actuated equipment, difficulties are encountered in moving the strips at the higher operating speeds desired for efficient production and undesirably complex and expensive modifications are needed to provide the capability of selectively producing an alternative, widely spaced pattern of perforations separated by leader/trailer sections. In the known rotary equipment, more than adequate operating speeds can be obtained, but mechanisms for selectively inhibiting the punches on the rotating drums are extremely complex and expensive.

Thus a need has arisen for apparatus and methods for perforating a strip of film or other web at high speed and with patterns widely spaced of perforations separated by leader/trailer sections. Such an apparatus and method must have the capabilities of positioning such perforations with great accuracy along the strip, changing the numbers of pitches of such perforations for strips of different lengths and changing the distance skipped between patterns for strips of different lengths.

SUMMARY OF THE INVENTION

In the apparatus for perforating a web in accordance with the invention, an elongated, flat track plate is provided on its upper surface with a plurality of gas flow apertures, each aperture being extended through and angled relative to the upper surface, whereby gas flowing through the apertures will support the strip above the upper surface. Preferably, the apertures are angled in the direction of movement of the strip along the track plate and arranged in at least one longitudinally extending row with some of the apertures being angled toward one side edge of the plate and others being angled toward the other side edge of the plate. Thus, flows of air through the apertures will support the web above the surface. The web is intermittently moved along the track plate. When the web is stopped, means positioned along the track plate perforate the web, thereby over the course of two or more indexes permitting the application of a pattern of perforations to the web.

The web is moved intermittently by a vacuum drum assembly positioned at the downstream end of the track plate, the rotor of the drum assembly preferably being formed as an integral part of the rotor of a servo motor. The vacuum stator of the vacuum drum assembly is provided with an initial atmospheric pressure plenum for permitting escape of air entrained between the web and the drum, a central low pressure plenum for applying vacuum to hold the web to the drum and a final at least atmospheric pressure plenum for easing the web's departure from the drum. Tension in the web is controlled by an inlet vacuum box and an outlet vacuum box positioned, respectively, upstream of the track plate and downstream of the vacuum drum assembly. The angular position of the vacuum drum assembly and the positions of the web in the vacuum boxes are monitored as control parameters for the indexing cycle.

An improved die apparatus according to the invention is for use in perforating elongated strips of material having edges and a width and preferably comprises an elongated, flat track plate having side edges and a first upper surface; a plurality of gas flow apertures arranged along the track plate, each aperture being extended through and angled relative to the first upper surface, whereby gas flowing through the apertures will support the strip above the first upper surface. At least one fixed die is provided which has a second upper surface substantially coplanar with the first upper surface, the fixed die being positioned along one or both of the side edges of the track plate and having a plurality of die apertures spaced along the track plate opposite the strip. At least one pair of edge guide means, spaced apart greater than the width of the strip outside the track plate and the fixed die, are provided for guiding the strip along the track plate and opposite the fixed die. To ensure that during movement the strip is supported above the track plate due to the Bernoulli effect, gas passage means, opening through each of the edge guide means, are provided for permitting escape of gas flowing beneath the strip from the gas flow apertures. The die apparatus may also include means extended transverse to the track plate and past the edge guide means and the fixed die for restraining movement of the strip away from said track plate during use of the die apparatus, the means for restraining comprising a plurality of apertures for passage of punches to the fixed die. In the latter embodiment, the gas passage means preferably opens toward the edges of the strip beneath the means for restraining movement. The gas passage means may also open beneath the fixed die to permit removal of debris.

In the method of the invention, a strip of material is positioned on an elongated track. A plurality of punch and die sets are provided along the track in position to perforate the strip. A first fraction or all of the punches and die sets are actuated to produce a first portion of a pattern of perforations through the strip. The strip is then repositioned or indexed to permit production of a second portion of the pattern. If only the first fraction of the punch and die sets were actuated for the test portion, the first fraction or a different fraction or all of the punch and die sets are actuated to produce the second portion. If all of the punch and die sets were actuated for the first portion, the first fraction or a different fraction of the punch and die sets are actuated to produce the second portion. These steps are then repeated until the desired pattern of perforations is completed.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
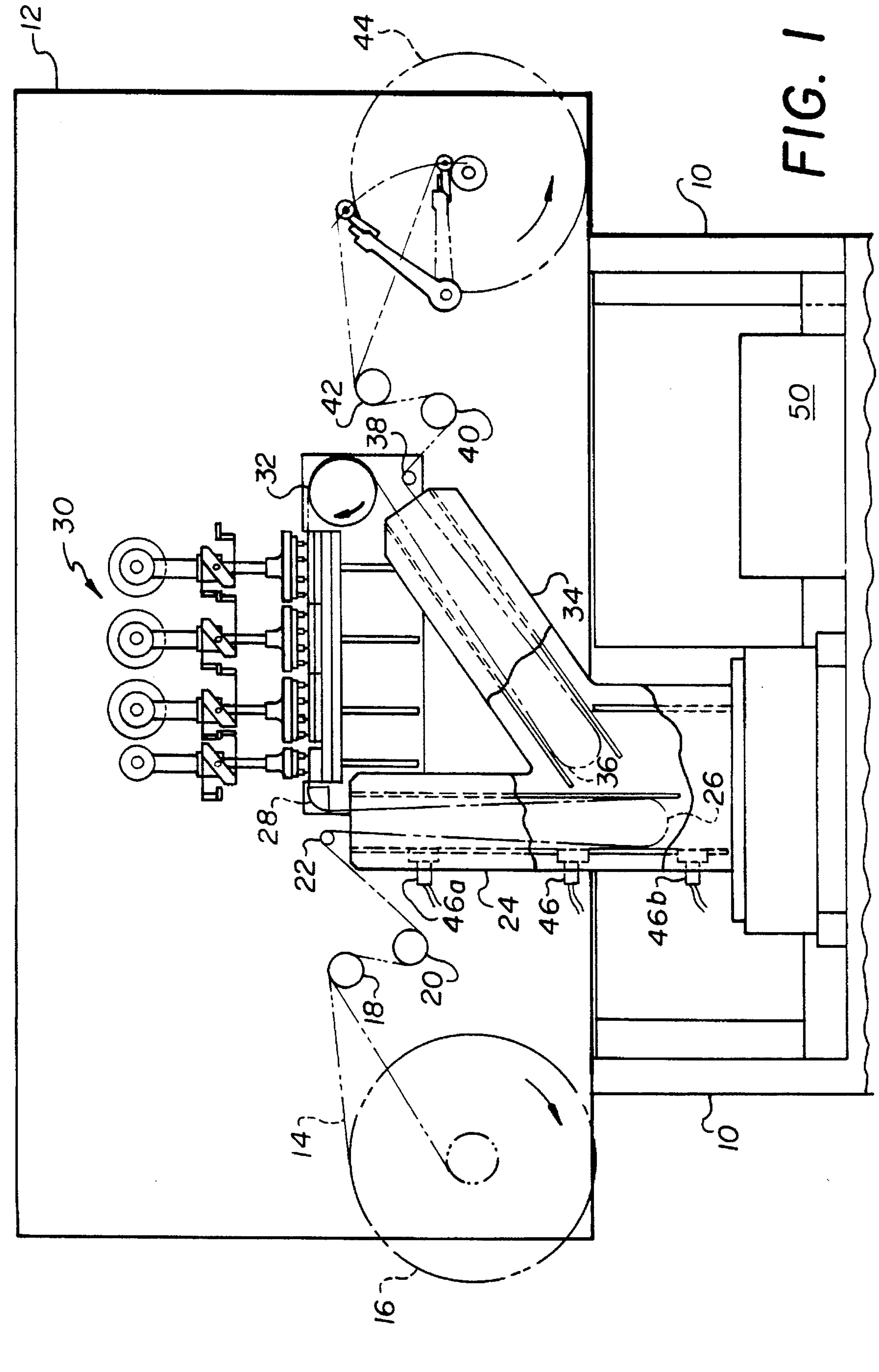
FIG. 1 shows a schematic elevation view of the apparatus according to the invention.

The following is a detailed description of the preferred embodiments of the invention, reference being made to the drawings in which the same reference numerals identify the same elements of structure in each of the several Figures.

OVERALL STRUCTURE AND OPERATION

Figure 2:
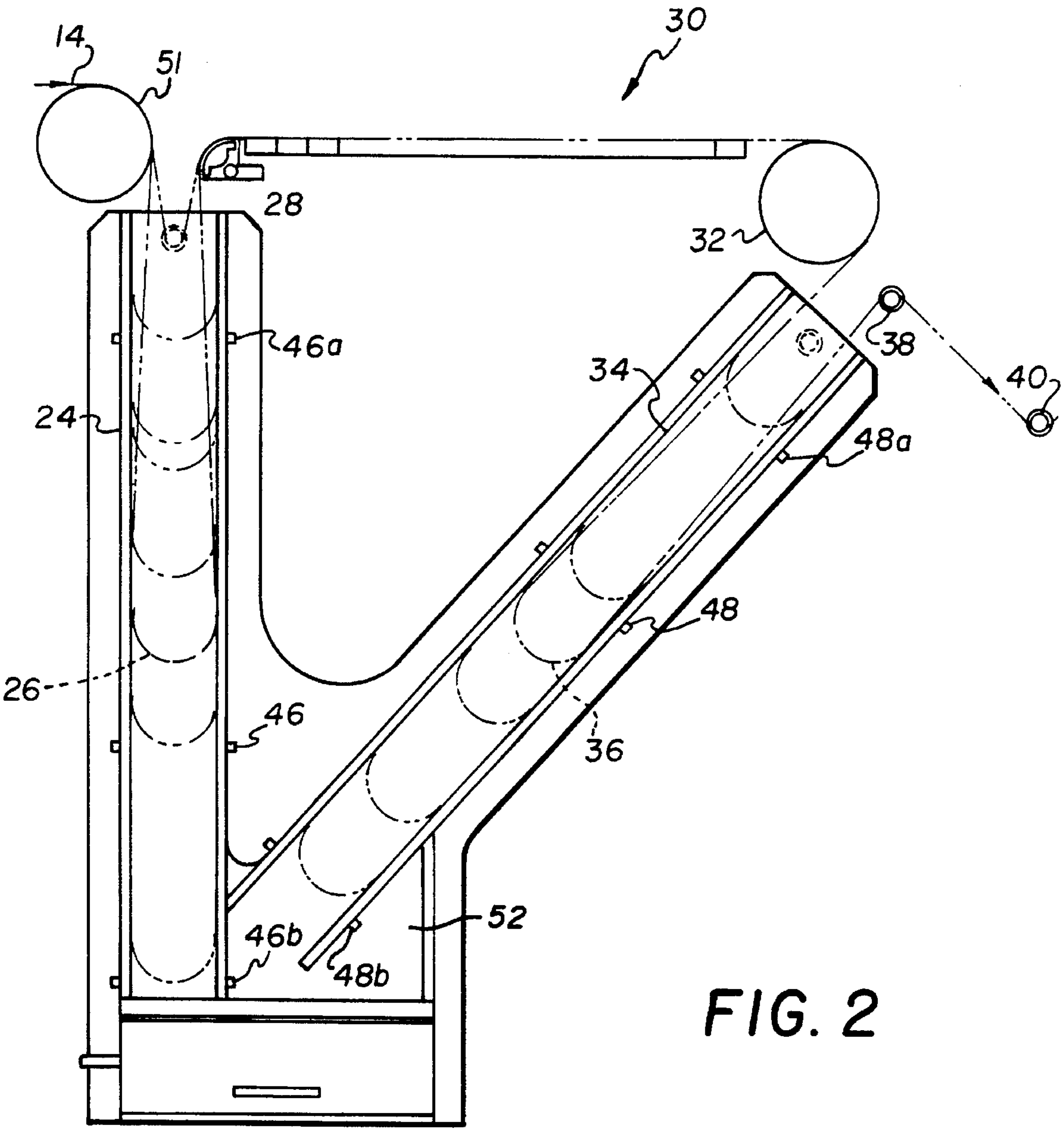
FIG. 2 shows an enlarged schematic elevation view of the infeed and outfeed vacuum box assembly.

FIG. 1 illustrates schematically an apparatus according to the invention which can selectively provide a variety of patterns of widely spaced perforations and leader/trailer sections on strips of photographic film or other materials, with high accuracy and at average web speeds in excess of 500 feet (152.4 m) per minute. A frame 10 supports a rigid metal face plate 12 on which the major components of the apparatus are mounted. The web 14 to be perforated is provided from an unwind stock roll 16 which in operation is driven to provide a substantially constant web speed by a servomotor mounted on the back side of face plate 12 and not illustrated. Web 14 passes from roll 16 over a first idler roller 18, under a second idler roller 20 and over a third idler roller 22, from which it passes into an infeed vacuum box 24 which may be of conventional design. If a splicer mechanism, for example, is provided between stock roll 16 and idler roller 22, an isolator such as a dancer mechanism, not illustrated, would be needed as well. In a preferred embodiment of the invention, as shown in FIG. 2, idler roller 22 may be replaced with an infeed vacuum drum 51. A loop 26 of web 14 rises and fails within vacuum box 24 in the familiar manner, so that an essentially constant tension is maintained on the web leaving vacuum box 24. Just above vacuum box 24, a conventional air bar 28, which may be of the type shown in commonly assigned U.S. Pat. No. 4,889,269, is mounted on face plate 12 to guide web 14 from vacuum box 24 through an approximately ninety degree turn and onto the track plate of the selectable perforator apparatus 30. From perforator apparatus 30, the web is wrapped approximately 135 degrees around a high performance, intermittently operated vacuum drum 32, from which the web passes into an outfeed vacuum box 34, which may be of conventional design. A loop 36 of web rises and fails within vacuum box 34 in the familiar manner, so that an essentially constant tension is maintained on the web entering vacuum box 34. Web 14 passes from vacuum box 34 over a first idler roller 38, under a second idler roller 40 and over third idler roller 42, from which it passes to a rewind stock roll 44 which in operation also is driven to provide a substantially constant web speed by a servomotor mounted on the back side of face plate 12 and not illustrated. Though the invention is illustrated for use to perforate webs which are then rewound onto a stock roll, those skilled in the art will appreciate that the apparatus upstream of the rewind stock roll also can be used to intermittently feed perforated web to an apparatus, not illustrated, for cutting the web into strips of various lengths and winding such cut strips onto spools. In such an application, vacuum box 34 preferably would have sufficient length to accommodate a loop 36 having a length approximately that of the longest strip to be cut and spooled.

In operation, the apparatus shown in FIGS. 1 and 2 is capable of high speed perforating of web 14. While unwind stock roll 16 and rewind stock roll 44 are rotated to maintain an essentially constant web speed, web 14 feeds into infeed vacuum box 24 and out of vacuum box 34 until infeed loop 26 reaches a maximum length as sensed by a photocell detector 46; and at the same time, outfeed loop 36 reaches a minimum length as sensed by a photocell detector 48. When these conditions have been satisfied, photocell detectors 46, 48 provide signals to a conventional programmable motion controller 50 which causes vacuum drum 32 to rotate and simultaneously advance a predetermined length of web 14 (a) away from perforator apparatus 30 and into outfeed vacuum box 34 and (b) out of infeed vacuum box 24 and into perforator apparatus 30. Vacuum drum 32 then dwells very briefly while perforator apparatus 30 is actuated by controller 50 to produce the perforations desired on the stationary portion of web 14. As will be discussed further, perforator apparatus 30 comprises a plurality of independently actuatable punch and die sets which can selectively produce a desired pattern of perforations during each dwell period. When the perforations have been completed and the infeed and outfeed loops have returned to their required maximum and minimum lengths, controller 50 again actuates vacuum drum 32 and the process repeats. Thus, both the pattern of perforations made during each dwell period and the length of Web 14 advanced between dwell periods can be selected to produce an overall desired pattern along the length of web 14. To monitor unusual variations in the infeed and outfeed of web 14, such as during start up and shut down, infeed vacuum box 24 may be provided with a low limit photocell detector **46*a* and a high limit photocell detector 46*b*, while outfeed vacuum box 34 may be provided with a low limit photocell detector 48*a* and a high limit photocell detector 48*b*. For example, operation may be stopped if infeed loop 26 moves above detector 46*a***.

Infeed and Outfeed Vacuum Boxes 24, 34

Figure 3:
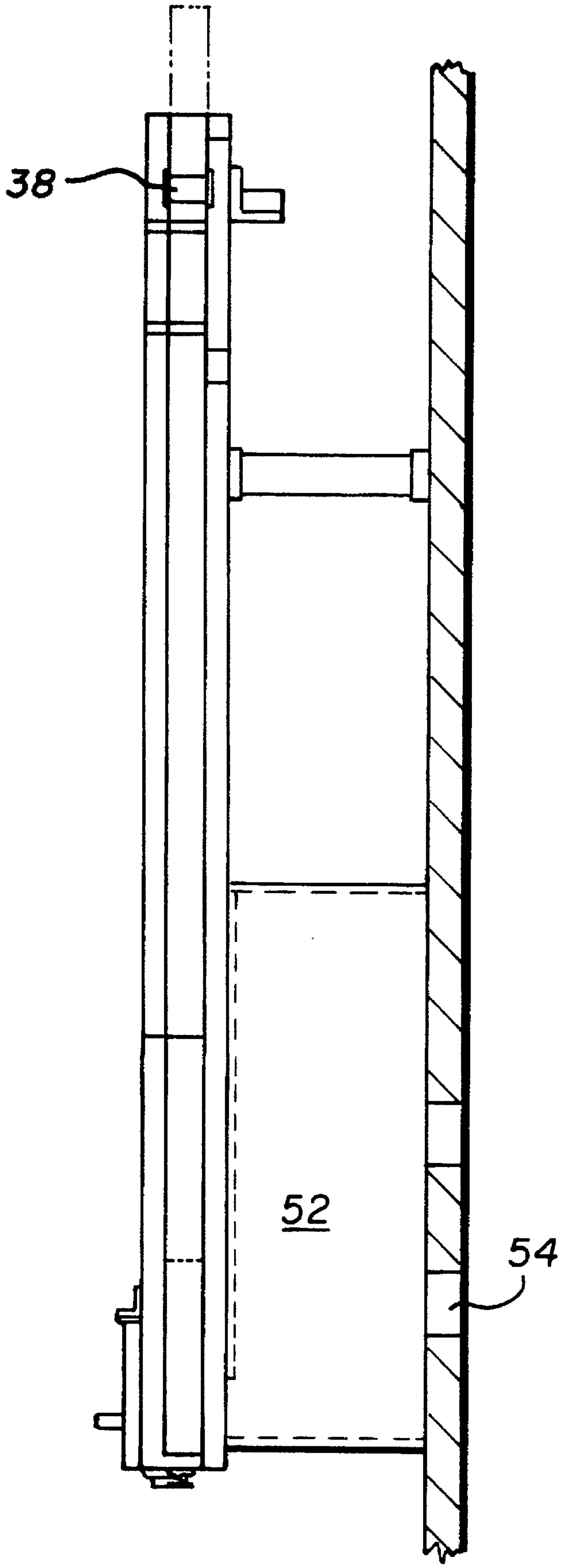
FIG. 3 shows a side elevation view of the apparatus of FIG. 2.

The vacuum box system shown in FIGS. 1 to 3 is useful for imparting a desired level of tension to a stationary span of web 14 positioned on a track plate within perforator apparatus 30, while minimizing tension transients in web 14 during periods of intermittent acceleration and deceleration. The vacuum box system also acts as a buffer between the region of continuous motion of web 14 from unwind stock roll 16 and the region of continuous motion of web 14 to rewind stock roll 44. Vacuum drum 32 also helps to isolate perforator apparatus 30 from downstream tension transients. Or, if rewind stock roll 44 is replaced by apparatus for cutting web 14 into shorter strips and winding them onto spools, the vacuum box system and vacuum drum 32 buffer perforator apparatus 30 from the intermittent operation of such a cutting and winding apparatus.

Each of vacuum boxes 24 and 34 in the conventional manner comprises an elongated box structure open at its upper end, the box having a length corresponding to the maximum desired length of loop to be stored in the box and a width somewhat wider than the width of the web to be tensioned. The web enters the box over a vacuum drum 51 or 32, or over an idler roller 22 or an air bar, and exits over another air bar 28 or roller 38. The air pressure above the loops 26, 36 typically is atmospheric, while below loops 26, 36 a subatmospheric pressure is applied by connecting both vacuum boxes to a vacuum line 54 connected to a vacuum source, not illustrated. The difference in pressure across the loops 26, 36 acts on the projected surface area of web 14 parallel to the closed end of boxes 24, 34 and induces a tension in the web. Thus, vacuum boxes 24, 34 are low inertia tension control systems which eliminate the need for roller accumulators and tensioners which have high inertia and can cause scratches on web 14 during high accelerations. Preferably, vacuum box 34 is set at an angle with its lower end closer to vacuum box 24; so that, a desired wrap angle is achieved on vacuum drum 32; and, when the vacuum boxes are connected to a common plenum as in the preferred embodiment of the invention, the air exchange distance between loops 26, 36 is substantially reduced. Under static conditions, when loops 26, 36 are maintained at any heights within the boxes, the pressure below the loops is substantially the same as that applied to vacuum line 54. When the position of the loop rises in a single, conventional box, however, the volume in the box below the loop increases and air flows between the box and the vacuum source through the flow impedance of line 54 and the interconnecting piping.

Three principal factors contribute to tension transients in web 14 as the positions of loops 26, 36 change within vacuum boxes 24, 34. The changes in position are necessarily due to a differential in the velocities between the web entering and the web leaving the vacuum box, which implies some acceleration of the web. A first factor is the inertial tension disturbance due to acceleration of the mass of the web. This typically is a rather small component of a tension transient. A second factor is the tension disturbance due to acceleration of the mass of the volume of air which moves in response to movement of the loop. This volume includes air above and below the loop, both in the vacuum box. A third factor is the tension disturbance due to the dynamic change in the pressure below the loop that occurs when the volume of air beneath the loop changes and before sufficient flow has occurred through the impedance of the interconnecting piping to allow the pressures above and below the loop to reach new steady values.

In the vacuum box system of the present invention, web tension transients are reduced which are due to acceleration of the air column in the box and due to partial evacuation of the low pressure side of the box caused by rapid changes in loop position. As shown in FIGS. 1 to 3, vacuum boxes 24, 34 preferably communicate pneumatically to a common vacuum plenum 52; so that, loops 26, 36 are exposed on their low pressure sides to essentially the same subatmospheric pressure. Also, common vacuum plenum 52 ensures that an essentially even exchange of air occurs between the two vacuum boxes during an index of web 14. With web 14 stopped while perforator apparatus 30 is actuated, loop 26 typically will be longer than loop 36. Then, when vacuum drum 32 indexes to bring a fresh section of web 14 to perforator apparatus 30, loop 26 shortens and loop 36 lengthens. Because the length of web pulled from loop 26 must exactly equal the length of web added to loop 36, the volume of the low pressure space beneath the two loops remains essentially unchanged, though it shifts in position between the two vacuum boxes due to the presence of common plenum 52. As a result, there is substantially no tension transient in the web due to a volume related differential pressure change of the nature discussed previously. There still exits a tension transient due to acceleration of the volume of air in each box, but the box length can be minimized; so that, each loop approaches a limit of one half the index length. As a practical matter, however, the length of each box preferably is one half an index length plus an additional length to account for minor drift in loop heights, due to errors in control, for example. The overall box length then approaches the full index length. Before the next index of vacuum drum 32, web 14 is fed into vacuum box 24 and pulled from vacuum box 34, so as to restore the conditions that existed before the preceding index. As a result, feeding and pulling of web 14 can happen in a continuous manner while the web within perforator apparatus 30 moves intermittently to allow perforation of a stationary portion of web 14. Preferably, as shown in FIG. 2, a continuously running infeed vacuum drum 51 is used rather than idler roller 22 since drum 51 will prevent the web from being drawn uncontrollably into vacuum box 24 during an upstream loss of tension.

Perforator Apparatus 30

Figure 4:
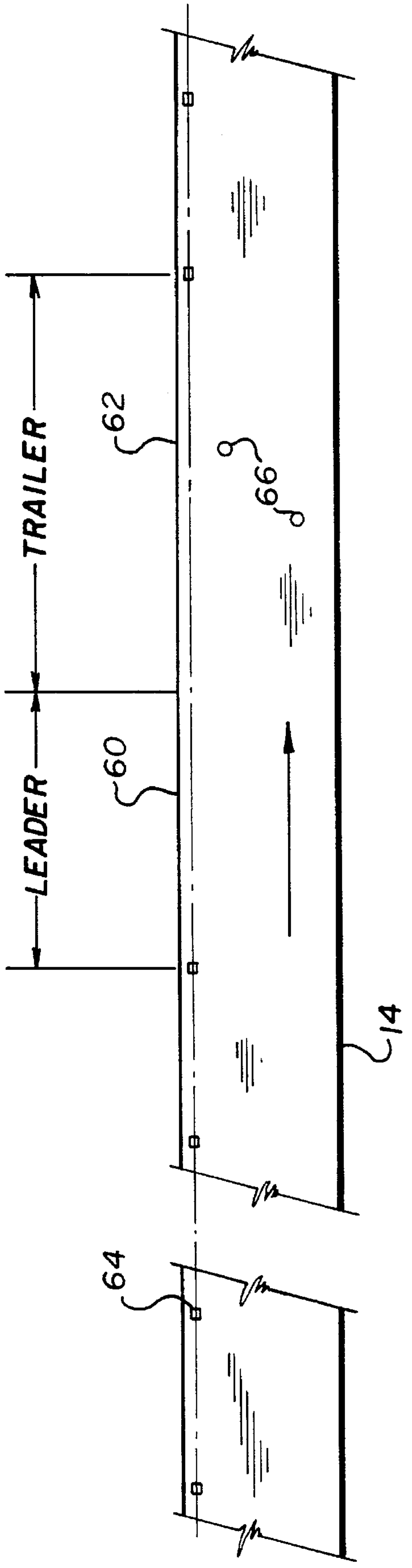
FIG. 4 shows a plan view of a fragment of an elongated web of material which has been provided with a pattern of widely spaced perforations and leader/trailer sections using the apparatus and method of the invention.

FIG. 4 illustrates fragmentarily a strip of web material, such as photographic film, having a pattern of widely spaced perforations and leader/trailer sections along its length. Though the apparatus and method of the invention are particularly adapted to producing such widely spaced perforations and leader/trailer sections, they may also be used to produce conventional, closely spaced perforations on either or both sides of a strip. The long strip is to be perforated and eventually cut into shorter strips each having a leader portion 60 with a geometry, not illustrated, for engaging the core of a spool in a camera and a trailer portion 62 for engaging the core of a spool in a film magazine. Note that in FIG. 4, the direction of web movement is from left to right toward stock roll 44. Later, when stock roll 44 is unwound at a spooler for web 14, each trailer portion 62 would be engaged with the core of a spool in a film magazine. But, if stock roll 44 were replaced by an apparatus for cutting web 14 into strips and winding the strips onto spools, the positions of leader portion 60 and trailer portion 62 would have to be reversed leaving perforator apparatus 30. Between leader portion 60 and trailer portion 62, each strip may be provided, for example, with widely spaced perforations 64 along one or both edges, each perforation being positioned, for example, to correspond to the location of a frame to be exposed on the film or for other purposes. Trailer portion 62 may also be provided, for example, with two or more feature perforations 66 at a different transverse location from perforations 64, feature perforations 66 being positioned to be sensed by or to coact in a desired manner with the camera. The pattern of perforations is non-continuous in the sense that there are lengthy leader and trailer portions of each film strip which have no perforations, portions which have widely spaced perforations to locate frames and portions which have feature perforations. The apparatus and method of the invention are particularly suited for producing such patterns of perforations; and those skilled in the art will appreciate that perforator apparatus 30, now to be described in detail, can readily be configured to produce a myriad of such patterns, as well as to produce continuous patterns of closely spaced perforations.

Figure 5:
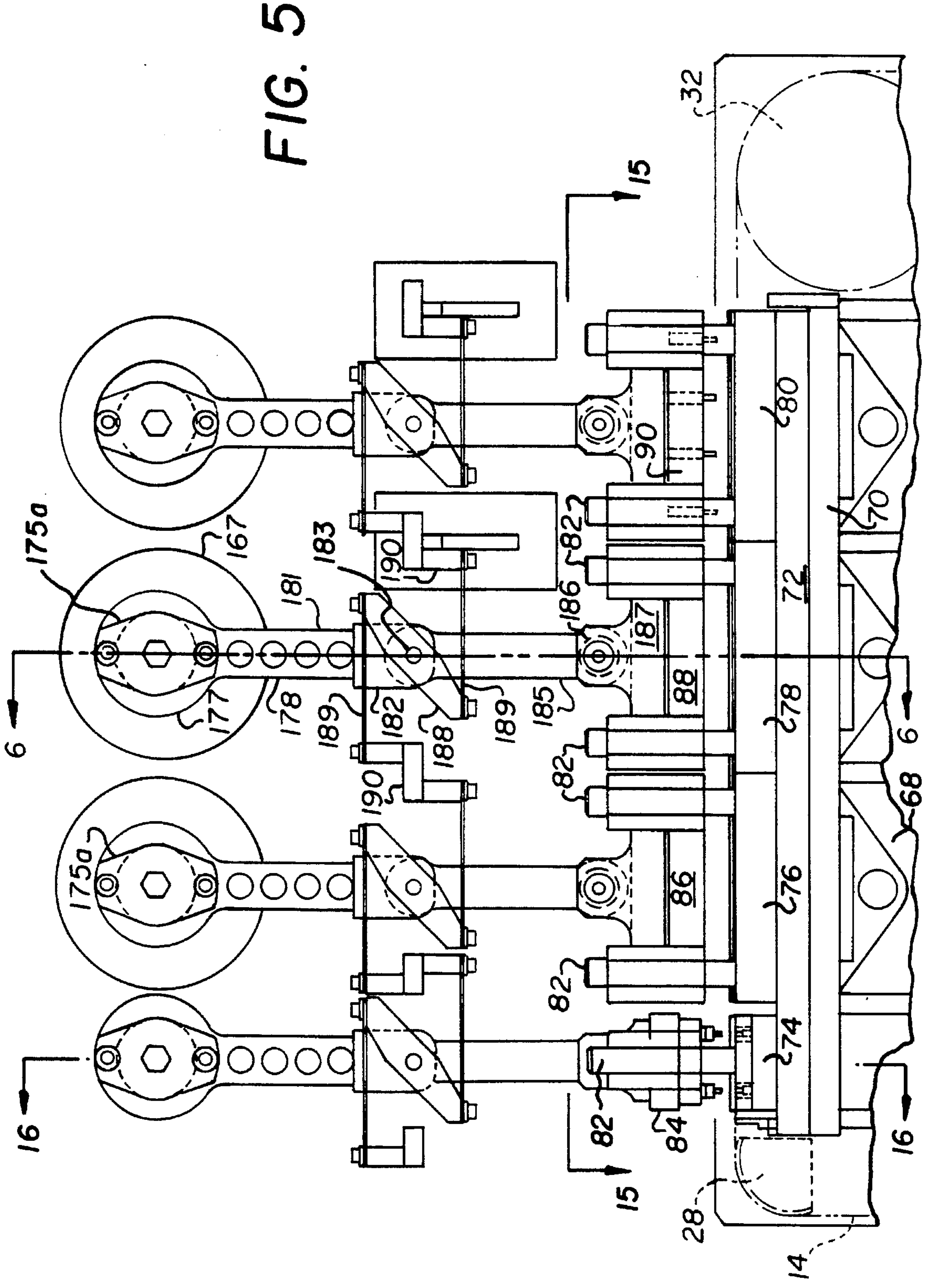
FIG. 5 shows a front elevation view of the perforator apparatus.
Figure 6:
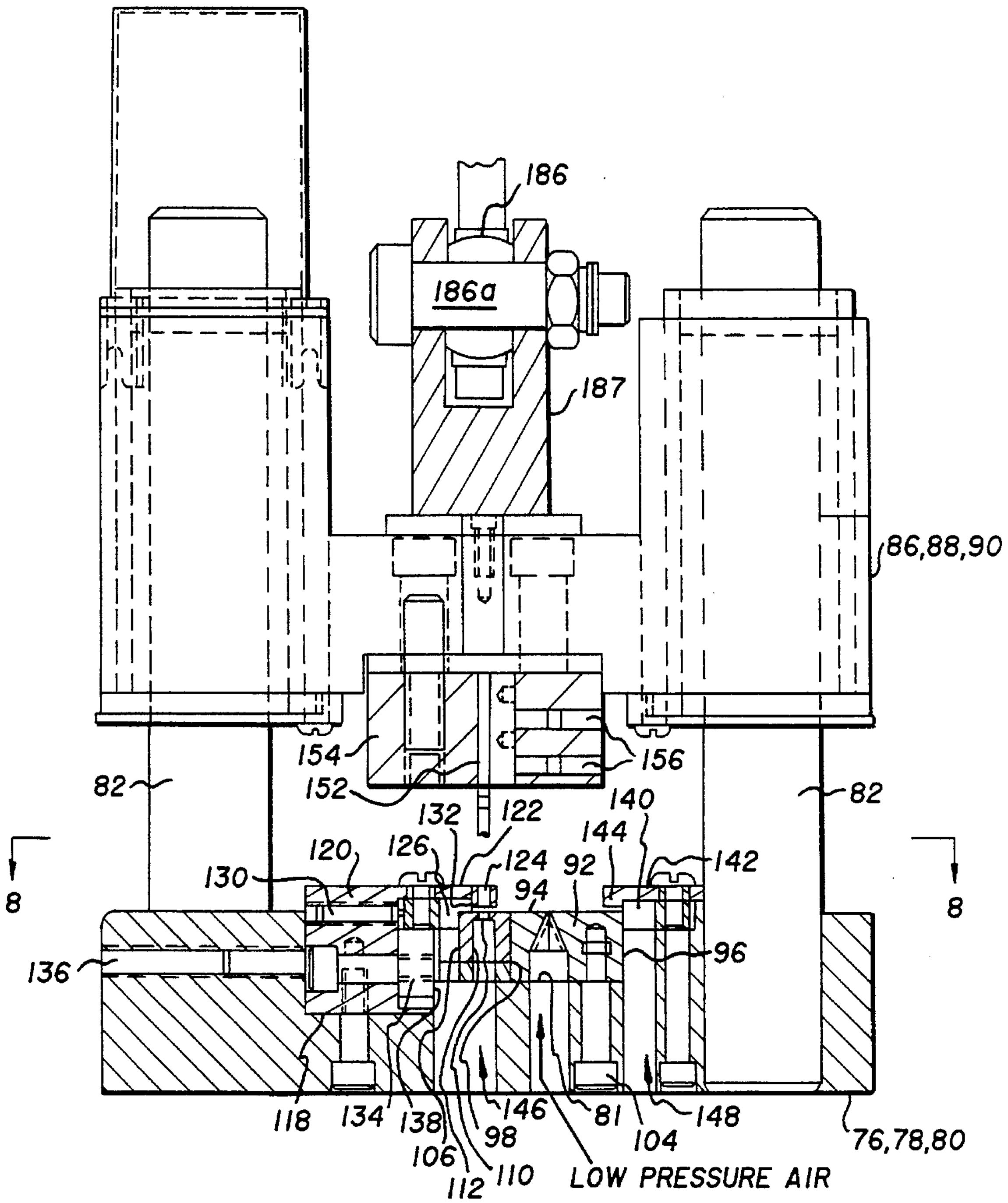
FIG. 6 shows the lower half of a view taken along line 6—6 of FIGS. 5 and 10.
Figure 7:
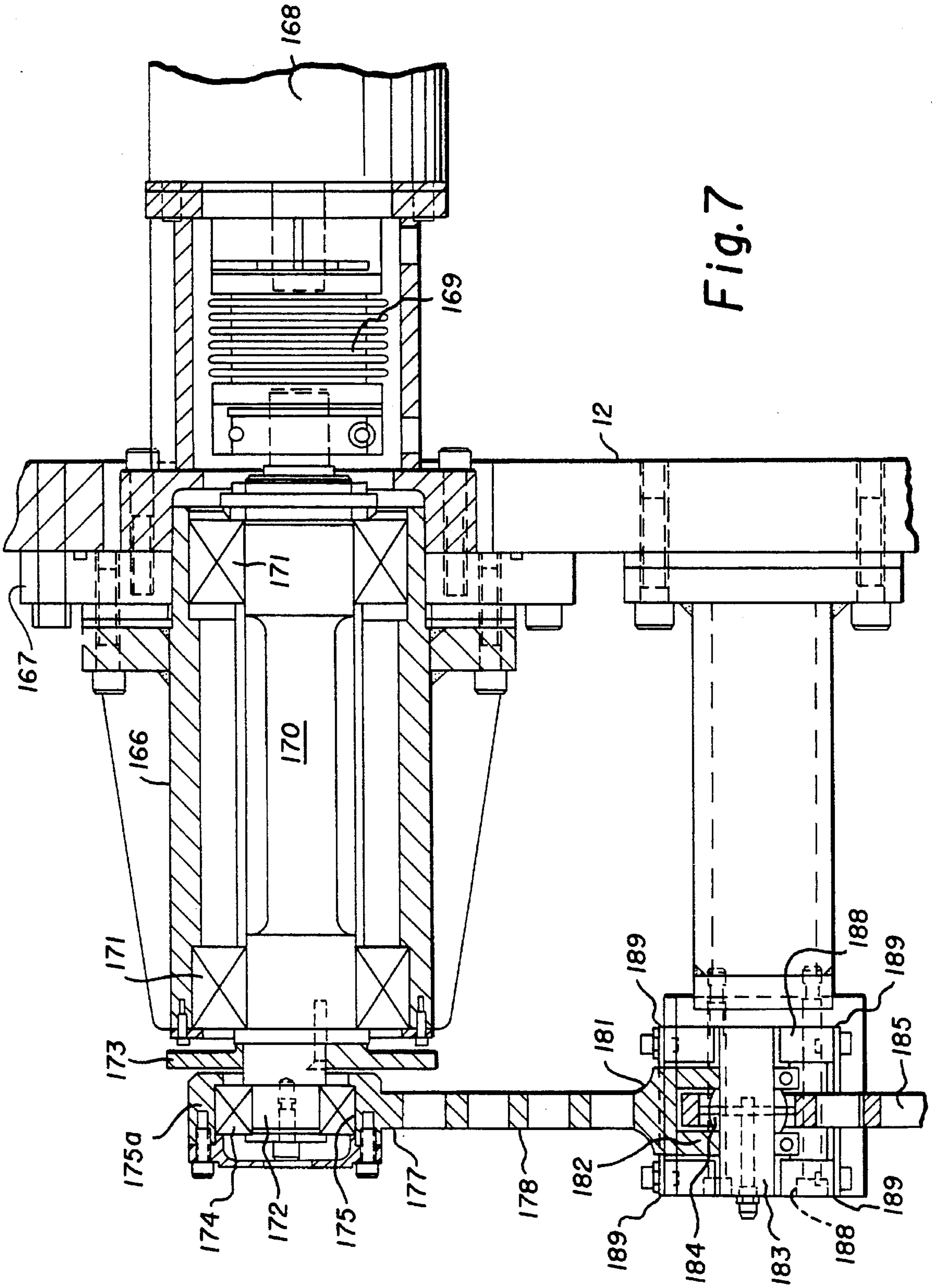
FIG. 7 shows the upper haft of a view taken along line 6—6 of FIGS. 5 and 10.
Figure 8:
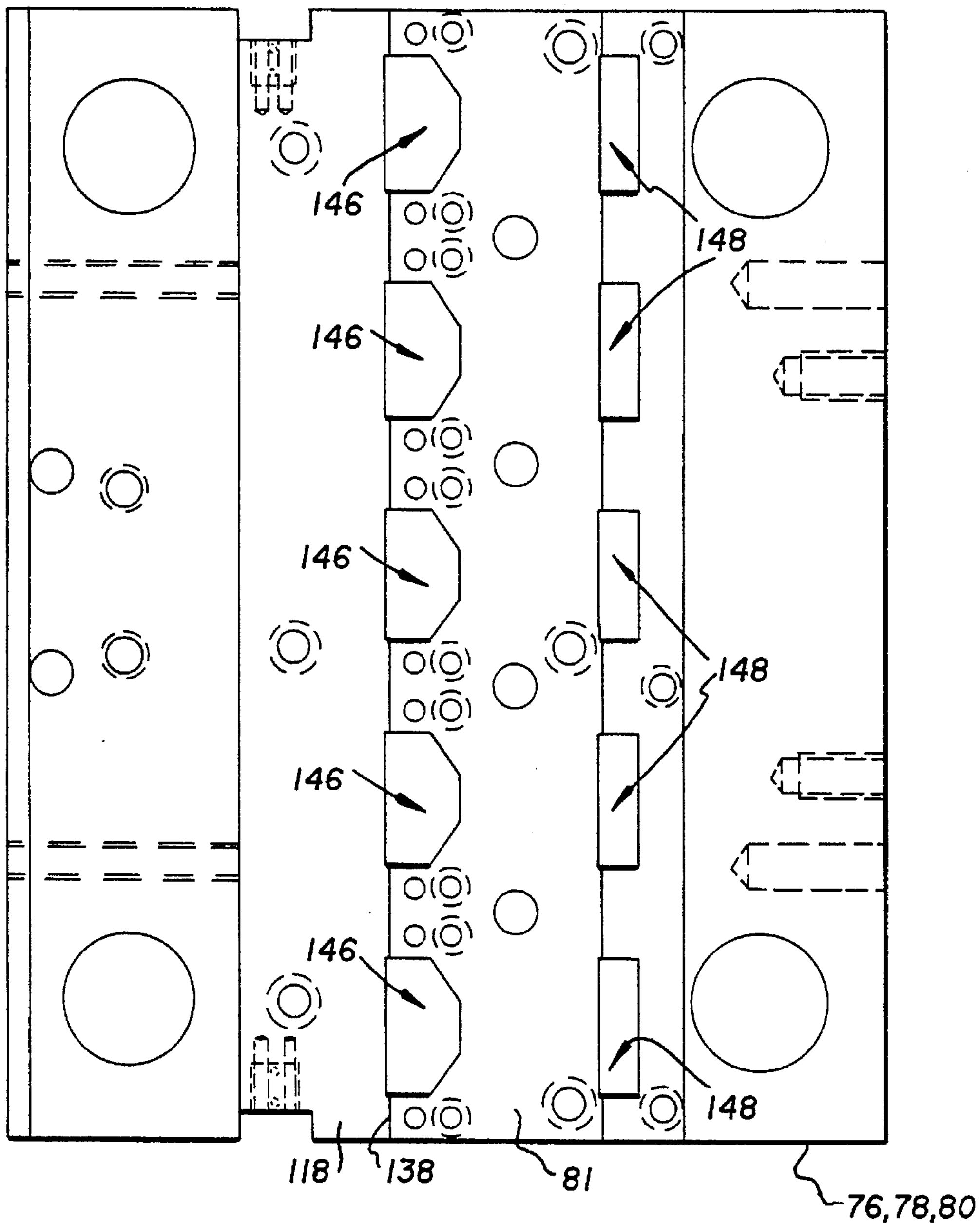
FIG. 8 shows a plan view of the bottom die plate.
Figure 16:
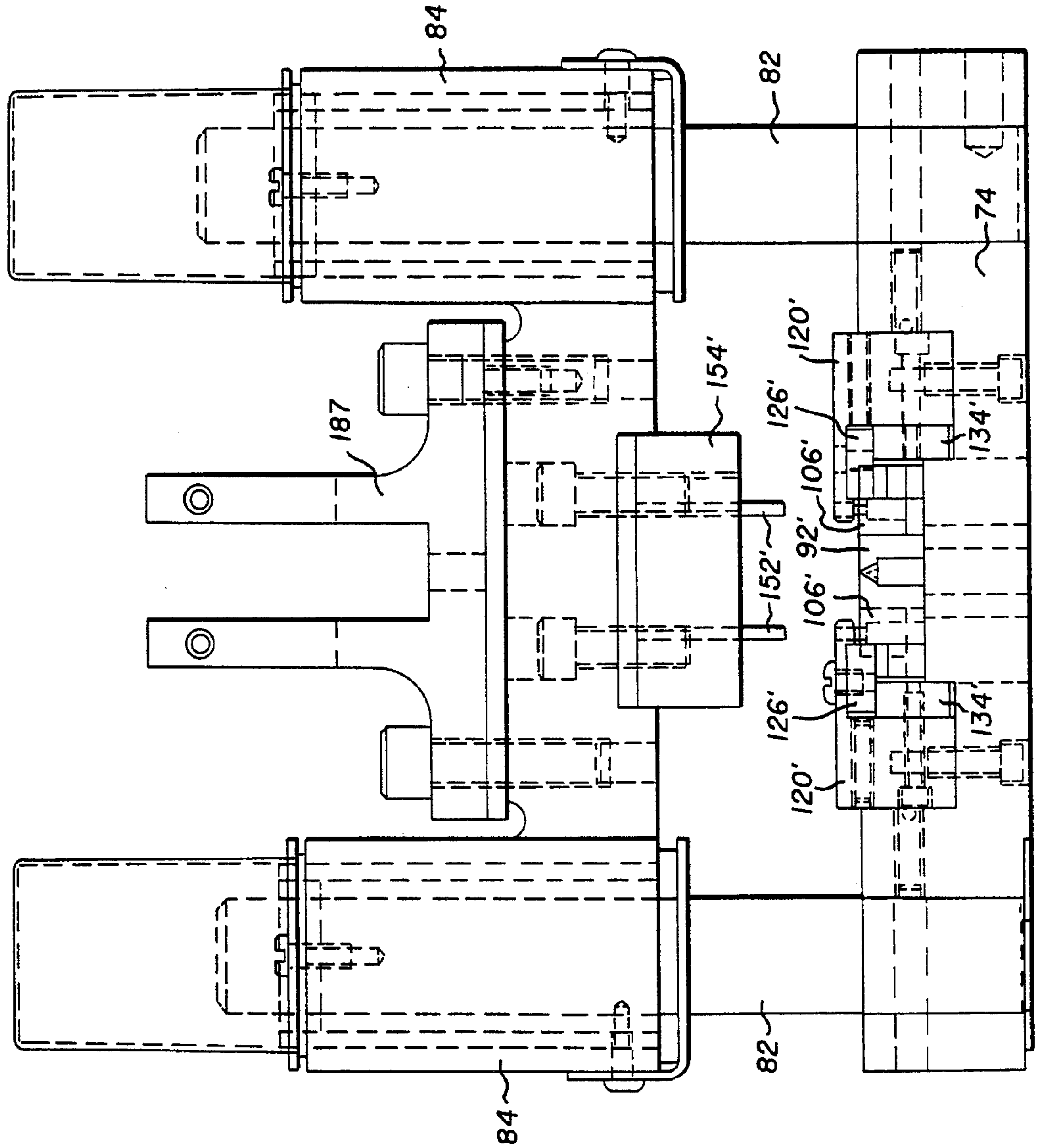
FIG. 16 shows the lower half of a view taken along line 16—16 of FIG. 5, similar to the view of FIG. 6.

FIGS. 5 to 16 illustrate certain details of perforator apparatus 30. A bracket is provided comprising a plate 68 mounted to face plate 12, plate 68 being secured along its upper edge to an elongated horizontal support plate 70. An elongated die support plate 72 is attached to the upper surface of support plate 70 and has attached to its upper surface a fixed bottom shoe 74 for the dies to make feature perforations 66, plus a plurality of fixed, essentially identical bottom shoes 76, 78, 80 to make edge perforations 64. FIGS. 6 and 8 illustrate bottom shoes 76, 78, 80. FIG. 16 illustrates bottom shoe 74. Those skilled in the art will appreciate that the number of punch and die sets to be used will vary depending, for example, on the number of frames per photographic film strip. As shown in part in FIGS. 5, 6, 10, 15 and 16, four guide rods 82 extend upwardly from each of bottom shoes 76, 78, 80 and two guide rods 82 are provided on bottom shoe 74. A movable upper shoe 84 is slidably mounted on the pair of guide rods 82 supported by bottom shoe 74, while essentially identical movable upper shoes 86, 88, 90 are slidably mounted on the two pairs of guide rods supported by each of bottom shoes 76, 78, 80.

The upper surfaces of fixed bottom shoes 76, 78, 80 each are provided with respective aligned, elongated recesses 81 each of which receives an individual, elongated air track plate 92 having a flat upper surface 94 and side edges 96, 98, as illustrated in FIGS. 6, 10 and 12 to 14. Track plate 92 is of the general type disclosed in copending, commonly assigned U.S. Ser. No. 586,093, filed 20 Sep. 1990 by M. Long, T. W. Palone and P. Kemp. On its underside, track plate 92 is provided with a centrally located, axially extended recess 100 which serves as an air plenum and is essentially centered on web 14. Pneumatically connecting recess 100 to upper surface 94 are a plurality of apertures 102 located essentially on the centerline of web 14. Apertures 102 extend through track plate 92 at an angle of preferably about 45 degrees to upper surface 94. Apertures 102 are angled alternately toward side edges 96, 98 at angles of preferably about 20 degrees. The diameter of apertures 102 is preferably about 0.022 inch (0.056 cm). Alternate apertures preferably are spaced on a pitch of about 0.648 inch (1.646 cm) along track plate 92. With apertures 102 configured and sized in this manner, a flow of air from recess 100 through apertures 102 will support a strip of photographic film centered on the row of apertures and also will urge the strip axially along the track plate in the desired direction of movement. Fasteners such as a plurality of bolts 104 may be used to secure track plate 92 to bottom shoes 76–80.

Figure 9:
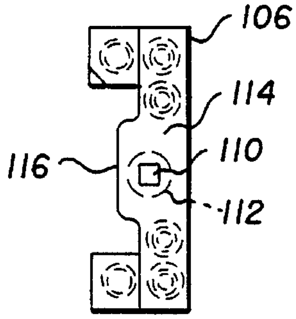
FIG. 9 shows a plan view of an individual punching die.
Figure 10:
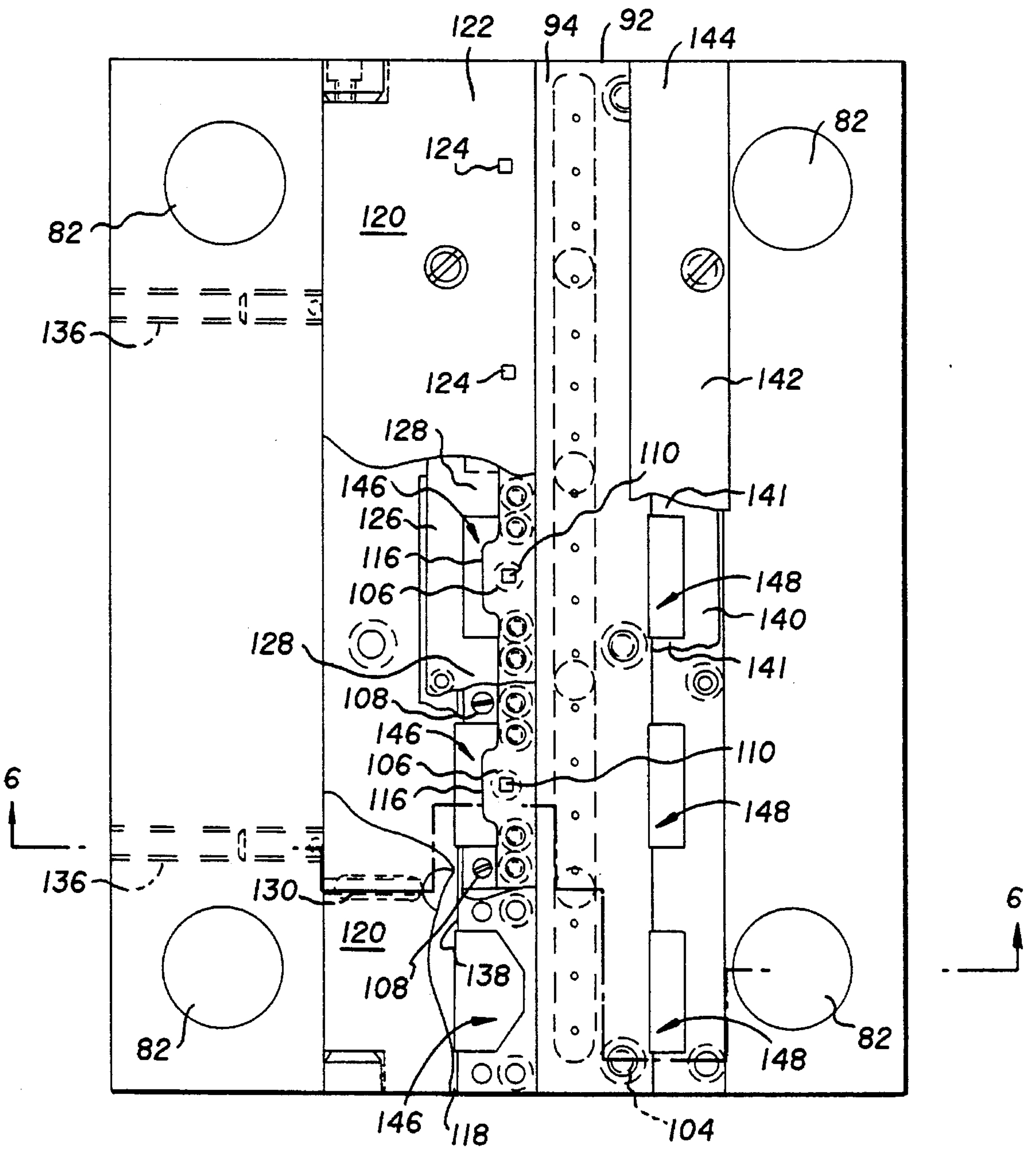
FIG. 10 shows a view, partially broken away, taken along line 8—8 of FIG. 6.
Figure 11:
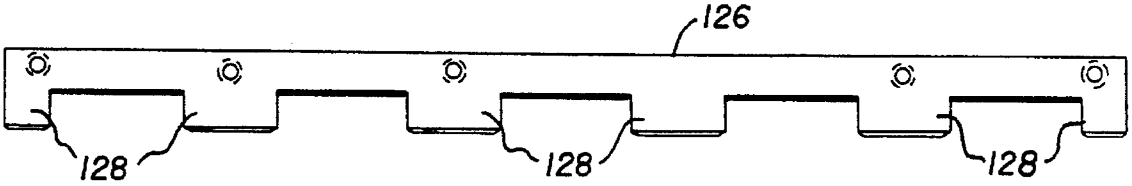
FIG. 11 shows a plan view of an edge guide used in the perforator apparatus.
Figure 12:
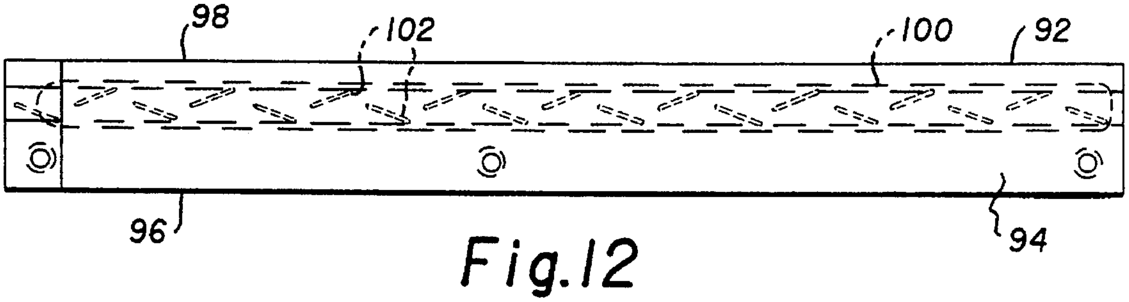
FIG. 12 shows a plan view of the track plate used in the perforator apparatus.
Figure 13:
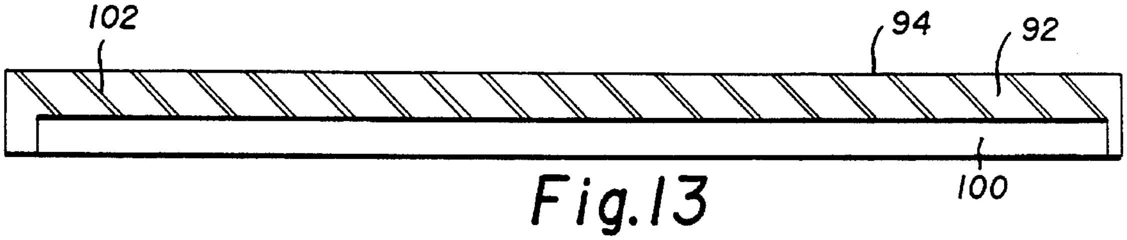
FIG. 13 shows an elevation view in section of the track plate of FIG. 12.
Figure 14:
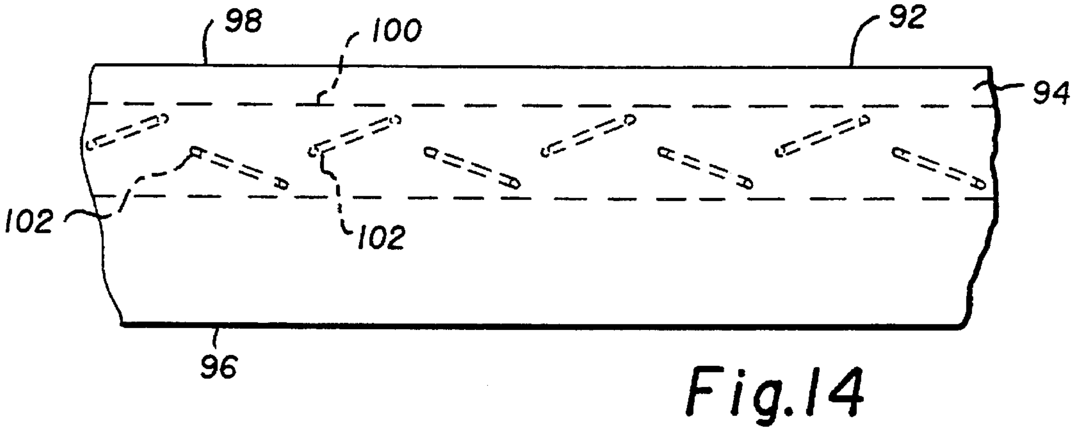
FIG. 14 shows an enlarged fragmentary view of the track plate of FIGS. 12 and 13.
Figure 15:
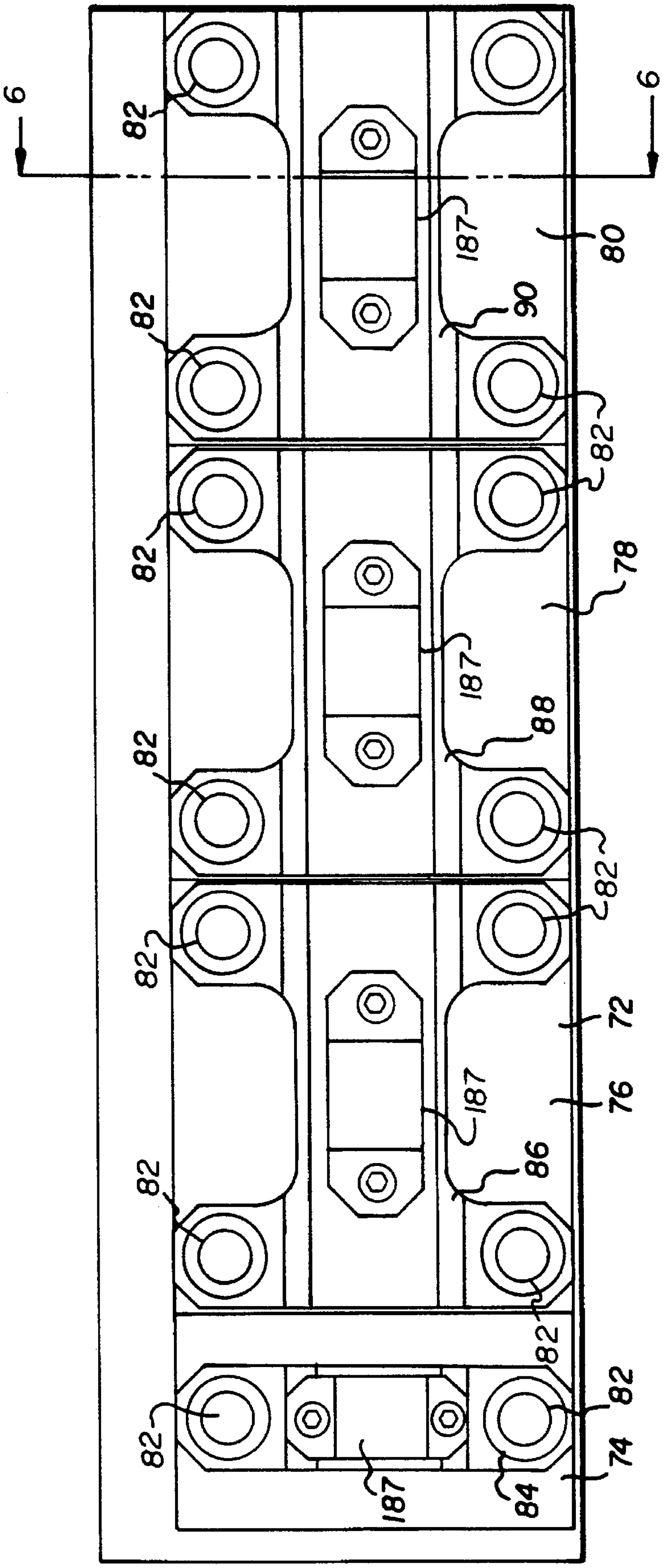
FIG. 15 shows a plan view of the perforator apparatus taken along line 15—15 of FIG. 5.

Although perforation dies may be placed along both side edges of track plate 92, as in the feature punch and die arrangement of FIG. 16, in the preferred embodiment for bottom shoes 76, 78, 80 a plurality of short die segments 106 are arranged along and abutting one side edge, preferably one die segment for each punch to simplify maintenance. See FIGS. 6, 9 and 10 Means such as locator pins 108 and other fasteners not illustrated may be used to secure die segments 106 to the bottom shoe. The bore 110 of each die segment communicates with a downwardly extended passage 112 for removal of chips created during punching. The uppermost surface 114 of each die segment is positioned coplanar with surface 94 of track plate 92 to provide a smooth surface over which web 14 moves. As shown in FIGS. 9 and 10, surface 114 includes a transversely extended, centrally positioned portion 116 which provides sufficient material surrounding bore 110 to permit proper dressing and peening of the die at assembly. Below recess 81, as seen in FIGS. 6 and 8, each bottom shoe is stepped downwardly and then extends transversely away from track plate 92 to define a support surface 118 for a continuous stripper plate and edge guide assembly 120 which is bolted from beneath to the bottom shoe. Preferably, assembly 120 extends along the entire length of track plate 92 and has a transverse flange 122 which extends above surface 114 of each die segment 106. Flange 122 includes a plurality of through holes 124 which are aligned with bores 110 in the die segments. Attached to the underside of flange 122 is an edge guide 126, shown in FIG. 11, having a plurality of lateral bosses 128 which extend toward die segments 106 on either side of central portions 116, as best seen in FIG. 10. A set of spring plungers 130 biases edge guide 126 against a downwardly extending lip 132 on flange 122, leaving slight clearance between bosses 128 and die segments 106. A precision ground spacer 134 is attached to the downwardly extending body of assembly 120 to precisely position holes 124 above bores 110 in die segments 106 and to position edge guide 126. A set of spring plungers 136 biases assembly 120 and spacer 134 against a wall 138 in the bottom shoe. On the opposite side of track plate 92, a second edge guide 140, identical to edge 126, is attached to the underside of a keeper flange 142 having a downwardly extending lip 144 against which edge guide 140 bears. Keeper flange 142 extends above surface 114 of each die segment 106 and is bolted from beneath to the bottom shoe. Flanges 122 and 142 thus prevent the edges of the film from lifting too far above surface 94 of track plate 92.

As seen in FIGS. 8 and 10, bottom shoes 76, 78, 80 include on either side of the bottom surface of recess 81 a plurality of transversely opposed, axially extended slots or passageways 146, 148 which open through the bottom of the bottom shoe. Slots 146 open beneath bores 110 in each die segment 106 and between bosses 128 on edge guides 126. Similarly, slots 148 open beneath edge guides 140 and between their bosses 141. Thus, slots 146 provide a pathway for removal of debris generated during operation of perforator apparatus 30. In addition, slots 146, 148 provide pathways for flow of air from apertures 102 in track plate 92 beneath web 14 and outwardly past the edges of the web, substantially without forcing the air to flow upward and then back over the web beneath flanges 122, 142. Due to the easy flow of air through slots 146, 148, web 14 is supported during movement slightly above track plate 92, due to the Bernoulli effect. Also, dirt that is scraped free from the edges of web 14 will fall through slots 146 and 148, thus minimizing dirt buildup in perforator apparatus 30.

As shown in FIGS. 5, 6, 15 and 16, each of movable upper shoes 84 to 90 supports two or more punch members for providing one or the other of perforations 64, 66. For optimum operation of the apparatus, it is important that each punch be positioned accurately above the corresponding bore in its die and that all punches extend to the same amount below their movable shoes. As seen in FIG. 6, each punch comprises a stick-like body portion 152, preferably having a generally rectangular cross section with the cutting end of the punch extending from the underside of a punch block 154 attached to the underside of the upper die shoe. In the familiar manner, a plurality of set screws 156 secures each punch in its punch block above bore 110 in the corresponding die segment 106. In the illustrated embodiment, four punch members 152 are provided at each of punches 76, 86; 78, 88; and 80, 90, while two punch elements are provided at feature punch 74, 84. Of course, other numbers of punch elements could be provided without departing from the scope of our invention.

The mechanisms which actuate the perforators are shown in FIGS. 5 to 7. A cylindrical housing 166 is mounted to face plate 12 by means of a support plate 167. A motor 168 is mounted to the rear of housing 166 and is connected by a coupling 169 to a driven shaft 170 supported for rotation within housing 166 by a pair of bearings 171. At the front end of shaft 170, an eccentric stub shaft 172 is mounted, the degree of eccentricity of shaft 172 determining the range of movement of the associated punch elements 152. A knurled hand wheel 173 also is mounted to the front end of shaft 170 to permit manual movement of the punches as necessary during set up and maintenance, for example. Stub shaft 172 supports a bearing 174 whose outer race mates with a bore 175 provided in a surrounding concentric collar **175*a*. Collar 175*a* is rigidly attached to the crank end 177 of a downwardly extended link 178**.

The drive end 181 of link 178 is provided with a clevis or similar fitting 182 which supports a shaft 183 of a spherical bearing 184. Supported by bearing 184 is a link 185 whose lower end is attached to a further spherical bearing 186 pivotably mounted by a shaft **186*a* to a bracket 187 attached to the upper surface of each upper shoe 84–90. To constrain movement of link 185 as much as practical to a straight up and down path, shaft 183 is prodded, preferably at both ends, with a modified Watt straight line mechanism. A diametrically extended arm 188 is mounted at each end of shaft 183, with the ends of the arm being equally spaced from the axis of the shaft. Each end of arm 188 is connected to an essentially horizontally extended flexure 189 whose other end is fixed to a mount 190 attached to face plate 12. Thus, as shaft 170 rotates and link 178 rocks back and forth and moves up and down, link 185 moves up and down on an essentially vertical path; thereby minimizing transverse movement or loading on punches 152 and ensuring more accurate formation of perforations 64, 66 in web 14**.

FIG. 16 shows an elevation view of the feature punch and die set for producing perforations 66. In this case, track plate 92' is functionally the same as track plate 92, though shorter. Because feature perforations 66 are provided on both sides of the center line of web 14, as seen in FIG. 4, die segments 106', functionally the same as segments 106, are provided on both sides of track plate 92' along with their respective stripper plate and edge guide assemblies 120', 126', 134'. Thus, punches 152' can be driven downward in the manner previously discussed to pass through the bores in the stripper plates, the web and the bores in the die segments to form feature perforations 66.

High Performance Vacuum Drum 32

Vacuum drum 32 is particularly suited for indenting web 14 through perforator apparatus 30 to permit the application of various non-continuous formats of perforations at high throughput rates. The most demanding operation of perforator apparatus 30 requires accurate positioning of web 14 between indexes while operating at average index web speeds in excess of 500 feet (152.4 m) per minute, with peak web speeds as high as 1500 feet (457.2 m) per minute. In order to meet such requirements, a drum 32 approximately 5.7107 inches (14.505 cm) in diameter must index one revolution in about 120 milliseconds, which can produce accelerations more than twenty times that of gravity. A single revolution is advantageous since it eliminates the effects of drum runout between indexes. In addition, the torsional resonance of the drum must be high enough to enable the drum to be controlled quickly and precisely to each new position; so that, perforation of web 14 can be done during a short dwell time of, say, 60 milliseconds. Of course, if perforation at slower speeds is preferred, a conventional ported vacuum drum may or may not be used.

Many conventional designs for vacuum drums known to the applicants may not meet such requirements for high acceleration and short settling time but would be acceptable for lower speeds and accelerations. Existing designs comprise a commercially available motor having an extended shaft which is coupled to an external vacuum drum. The relatively high polar moment of inertia of the masses of the drum and the motor increases the torque required for acceleration. This fact, in combination with the relatively low torsional stiffness of the shaft coupling these masses, can result in a torsional resonance at a frequency that is too close to the desired control bandwidth of a perforator system. At frequencies near such a resonance, significant mechanical energy would be stored in the torsional windup of the shaft as phase shifts occur between the angular velocity and displacement of the dream relative to motor. As a result, the conventional designs would be expected to exhibit attenuation and magnification frequency points in the response of the drum to torsional input energy.

In vacuum drum 32 as illustrated in FIGS. 17 to 23, an annular spacer ring 210 is used to position a cylindrical motor housing 212 at a distance from face plate 12, a plurality of bolts 214 being passed from the back side of face plate 12, through spacer ring 210 and threaded into a base flange on motor housing 212. An opening 216 through face plate 12 allows access to the back side of the vacuum drum assembly. Motor housing 212 comprises a plurality of axially extending passages 218 for cooling air, the passages being connected by radial ports 220 to an inlet plenum for cooling air which is defined between a cylindrical magnetic shield 222 and the housing. A radially extending inlet port 224 is attached to shield 222 to provide a convenient connection to a source of cooling air, not illustrated.

Figure 18:
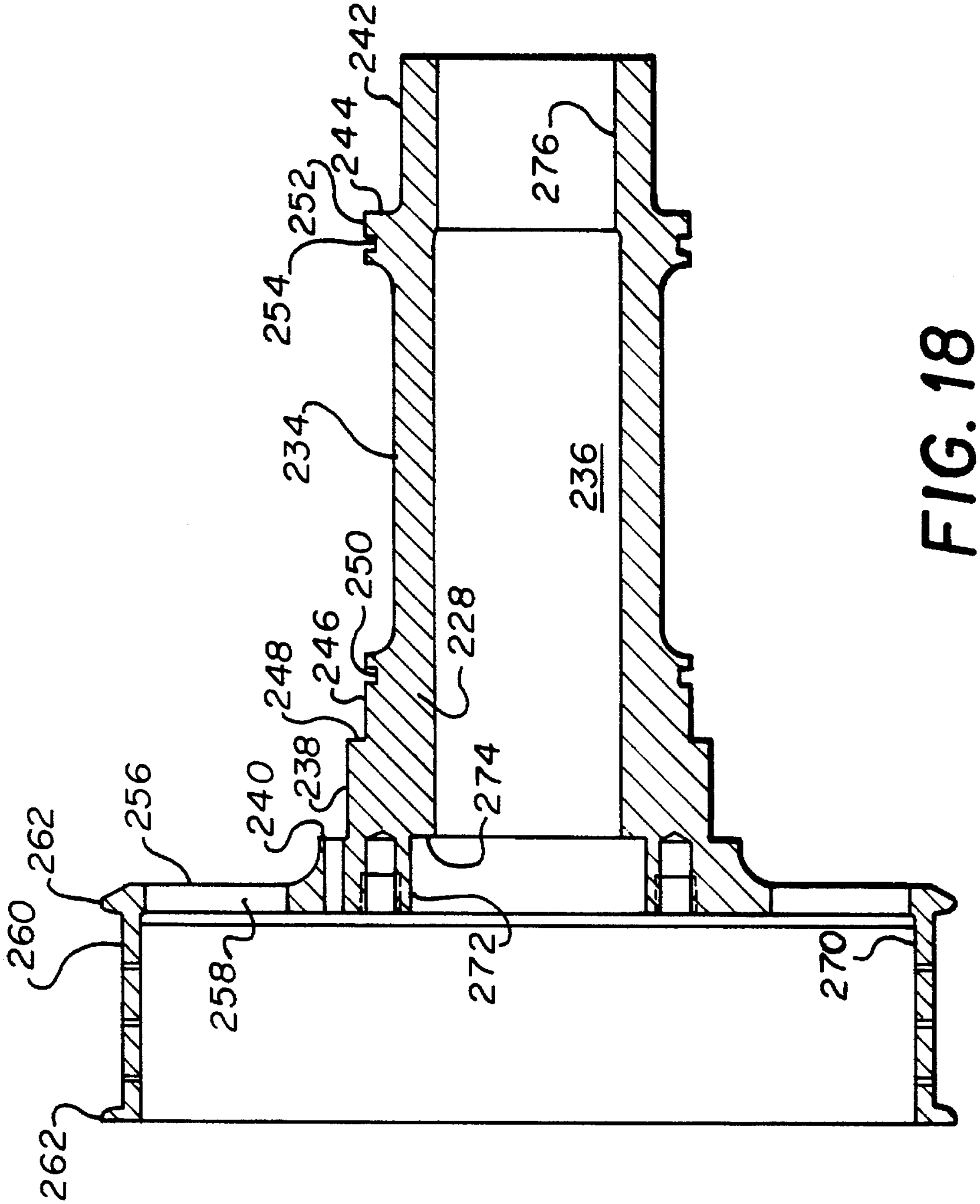
FIG. 18 shows a sectional view of the rotor for the vacuum drum, taken along line 18—18 of FIG. 19.
Figure 19:
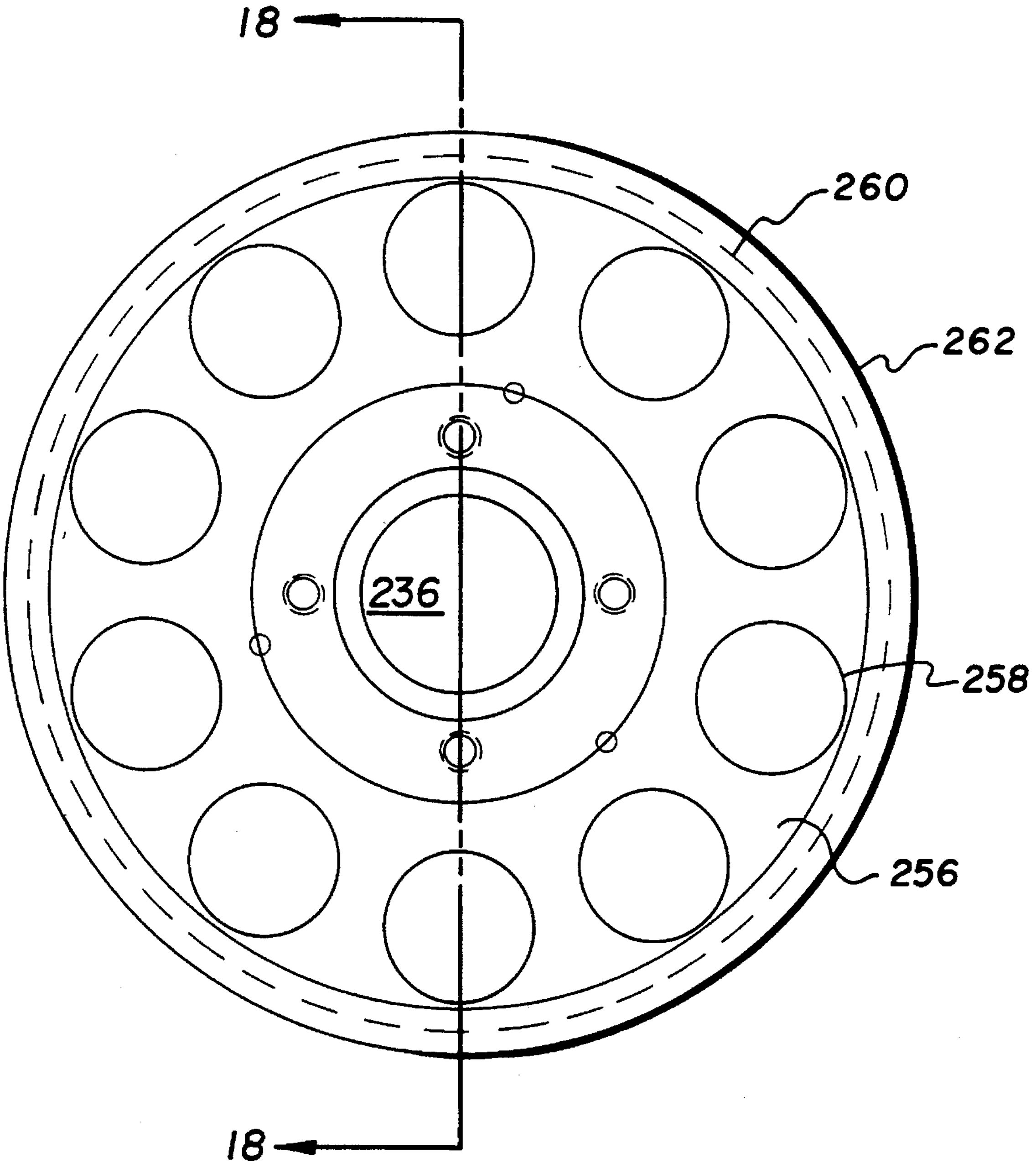
FIG. 19 shows an end view of the rotor, as seen from the left of FIG. 18.

The inside cylindrical surface or bore 226 of motor housing 212 receives and supports an assembly comprising a vacuum drum rotor 228, a vacuum drum stator 230 and a frameless, brushless servo-motor 232. As shown in FIG. 18, vacuum drum rotor 228 comprises a hollow rotor shaft 234 with a central bore 236. On its exterior surface, shaft 234 is provided with a cylindrical front bearing support surface 238 bounded at its front end by a shoulder 240 and a cylindrical back bearing support surface 242 bounded at its front end by a shoulder 244. Between bearing support surfaces 238, 242, shaft 234 is provided with a cylindrical front pilot surface 246, which is bounded at its front end by a shoulder 248 and provided with a circumferential groove 250 for an O-ring. In front of back bearing surface 242 is provided a cylindrical back pilot surface 252, in front of which is located a circumferential groove 254 for another O-ring. In front of shoulder 240, vacuum drum rotor 228 comprises a preferably integral, radially extending flange 256 having a plurality of circumferentially spaced, axially extended holes 258 for lowering the polar moment of inertia of the rotor. Flange 256 is joined to an axially extending drum shell 260 having an outer, right circular, cylindrical surface bounded by radially extending edge flanges 262 for keeping web 14 properly engaged with the vacuum drum. Vacuum drum rotor 228 may be made from materials lighter than steel such as aluminum, titanium or various composite materials, which further improve the performance of the apparatus by lowering the polar moment of inertia. Of the rotor and permitting somewhat higher accelerations.

Figure 21:
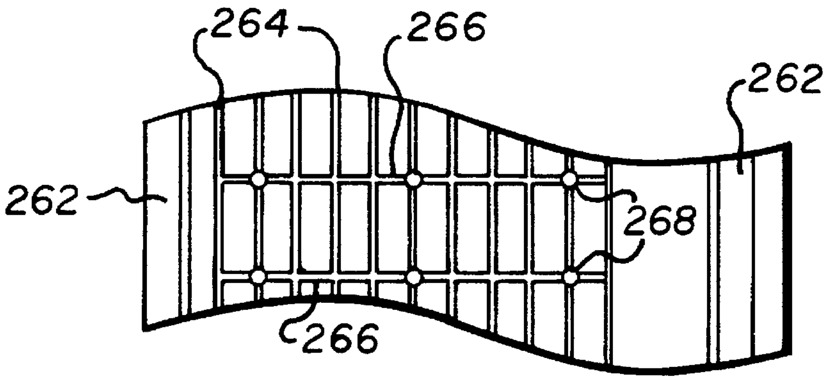
FIG. 21 shows an enlarged fragmentary plan view of the rim of the vacuum drum, also indicating the grooves and passages for applying and releasing vacuum.
Figure 20:
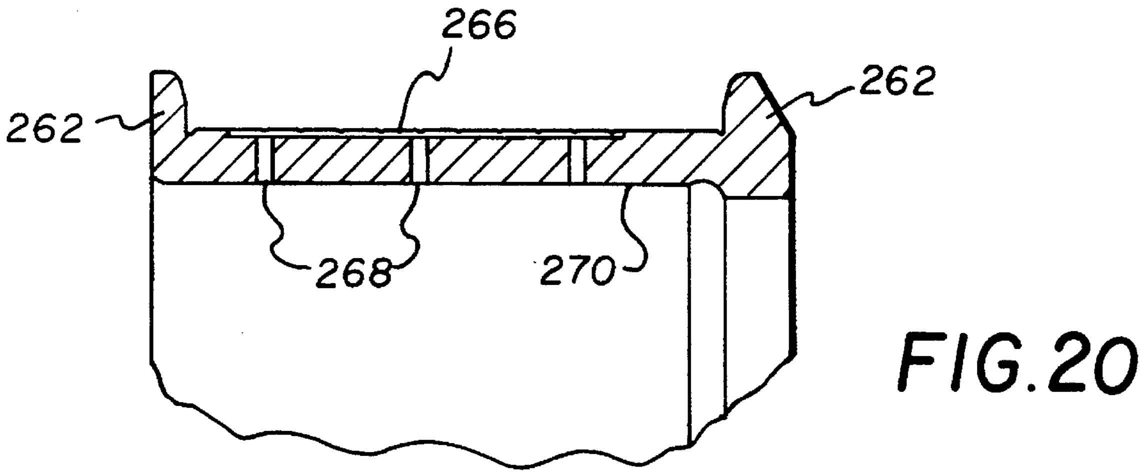
FIG. 20 shows an enlarged fragmentary sectional view of the rim of the vacuum drum, indicating the grooves and passages for applying and releasing vacuum.

FIGS. 20 and 21 illustrate fragmentarily the pattern of grooves and vacuum passages at the cylindrical surface of shell 260 which enable vacuum drum 32 to grip web 14 during indexing. A pattern of this general sort is illustrated in commonly assigned U.S. Pat. No. 3,630,424 which is incorporated by reference into this specification. A plurality of circumferentially extending grooves 264 are provided across the axial width of shell 260, the grooves being preferably about 0.007 inch (0.018 cm), deep and preferably about 0.015 inch (0.038 cm), wide. The axial spacing between grooves 264 preferably is about 0.100 inch (0.254 cm). Grooves 264 are interconnected by a plurality of axially extending cross-feed grooves 266, grooves 266 being preferably about 0.020 inch (0.051 cm), deep and preferably about 0.016 inch (0.041 cm), wide. Preferably, grooves 266 are spaced about 5 degrees apart for a shell 260 having the diameter previously mentioned. A plurality of radial holes 268 are provided, preferably about 0.041 inch (0.104 cm) in diameter, from the interior surface 270 of shell 260 to axially spaced intersections of grooves 264, 266, to permit application of reduced or elevated air pressure to the underside of web 14.

Figure 22:
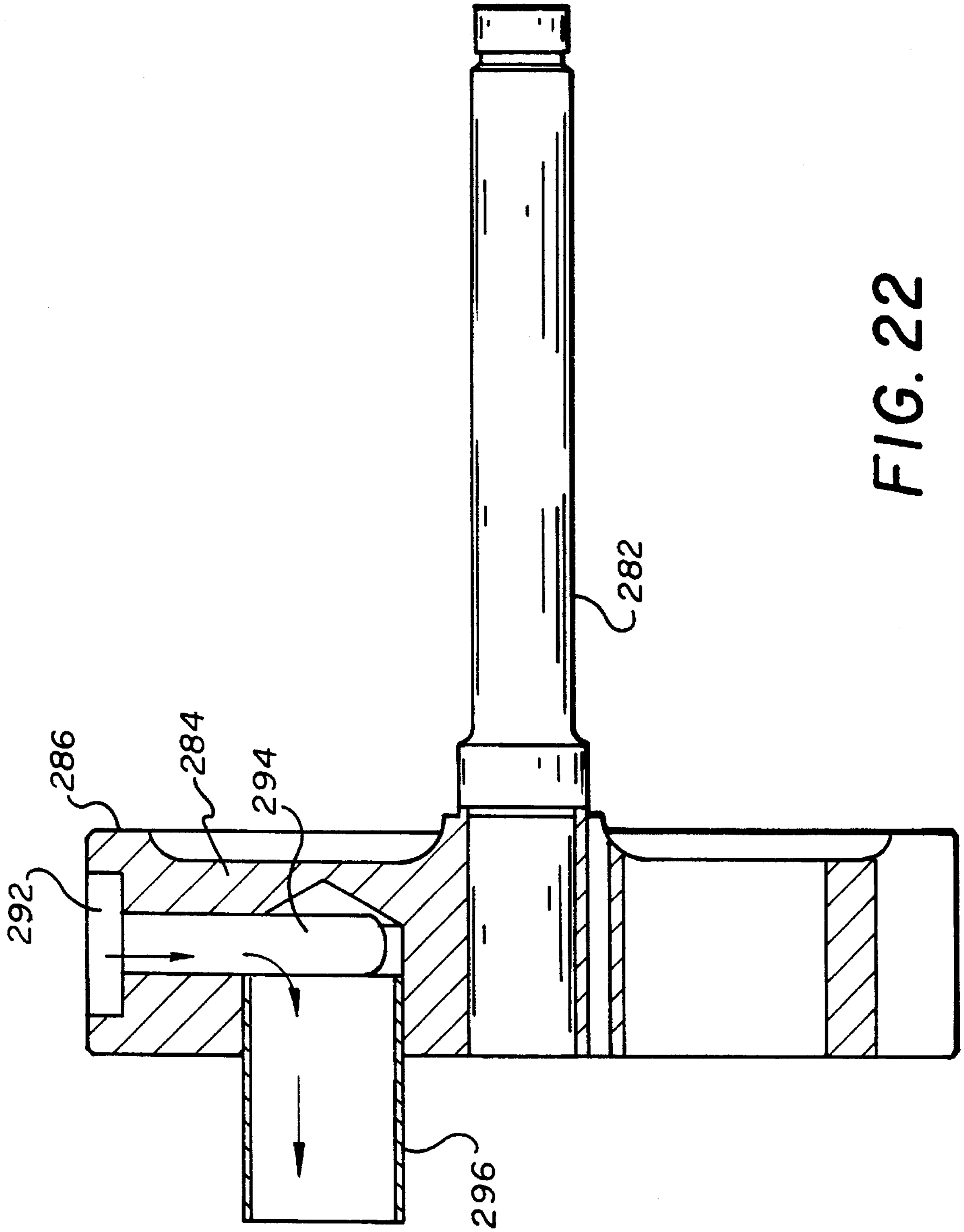
FIG. 22 shows an elevation view, partially in section, of the vacuum stator for the vacuum drum, taken along line 22—22 of FIG. 23.
Figure 23:
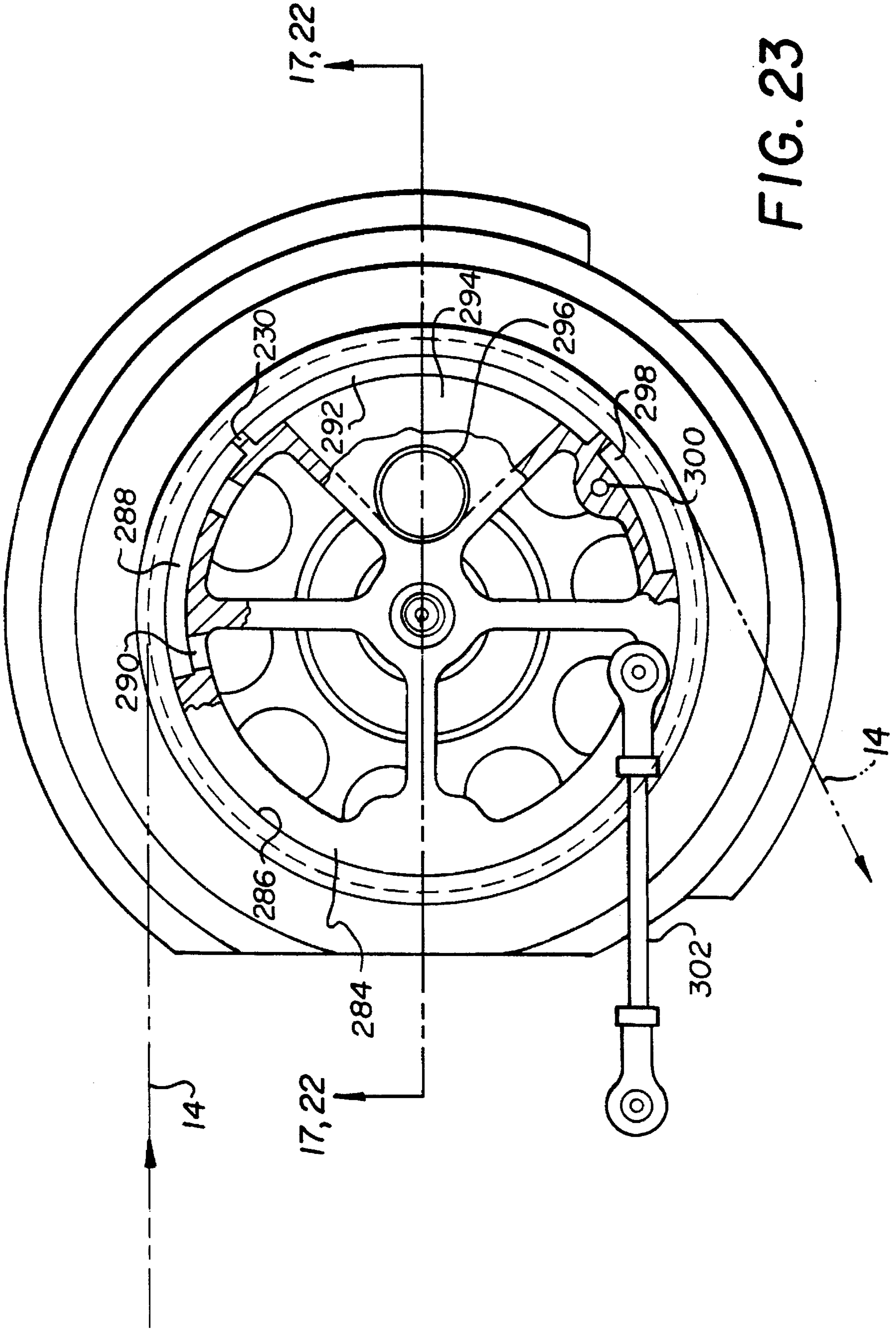
FIG. 23 shows an end view of the apparatus, as seen from the left side of FIG. 17.

Within vacuum drum rotor 228, bore 236 includes a cylindrical front pilot surface 272 bounded at its back end by a shoulder 274, and a cylindrical back pilot surface 276. A front bearing 278 and a rear bearing 280 are mounted on pilot surfaces 272, 276 to support the stationary shaft 282 of vacuum drum stator 230. A bearing spacer sleeve 283 surrounds shaft 282 and extends between bearings 278, 280. As shown in FIGS. 22 and 23, shaft 282 supports at its front end a stator manifold 284 having an exterior, right circular, cylindrical surface 286 which fits closely within interior surface 270 on shell 260, to ensure an even application of vacuum in a manner to be described. Exterior surface 286 is provided with a circumferentially extending recess 288 which extends over an arc of preferably about 52 degrees, to form an ambient air plenum which is vented to atmospheric pressure through a pair of radial bores 290. Adjacent recess 288 is a second circumferentially extending recess 292 which extends over an arc of preferably about 90 degrees, to form a low pressure or vacuum plenum which communicates through an arcuate, radially extending passage 294 with an axially extending vacuum port 296 for connection to a low pressure source such as a vacuum pump, not illustrated. Adjacent recess 292 is a third circumferentially extending recess 298 which extends over an arc of preferably about 32 degrees, to form an atmospheric or high pressure plenum with a port 300 for connection to atmosphere or a source of high pressure air. Finally, as shown in FIG. 23, a rigid link 302 extends between manifold 284 and face plate 12 to fix vacuum drum stator 230 against rotation.

Referring again to FIG. 17, the magnet assembly 304 of motor 232 is bonded to a rotor sleeve 306 with a suitable adhesive. The assembly is then slipped over pilot surfaces 246, 252. Since there is clearance between sleeve 306 and surfaces 246, 252, a pair of O-rings 308 are provided in grooves 250, 254 to ensure that the sleeve remains concentric with the pilot diameters during assembly and preloading. The O-rings also ensure that motor 232 will perform at maximum efficiency by keeping the concentricity of the parts within acceptable limits. A flat preload ring 310 is pressed against the back end of sleeve 306 by a stack of disk springs 312 which in turn are preloaded by the inner race of a back beating 314 mounted on beating surface 242. Disk springs 312 preload sleeve 306 against bearing 344 which, in turn, bears against shoulder 240. The friction from the preload transmits the necessary torque to vacuum drum rotor 228. Disk springs 312 also compensate for thermal expansion. Bearing 314 is pressed against springs 312 by a retainer cap 316 attached to the back end of shaft 234 by suitable fasteners such as a plurality of bolts 318. Retainer cap 316 thus rotates with shaft 234. A torsionally rigid encoder coupling 320 is attached between retainer cap 316 and an encoder 322 mounted on an encoder housing 324 which is mounted on the back end of motor housing 212 by suitable fasteners such as a plurality of bolts 326.

Figure 17:
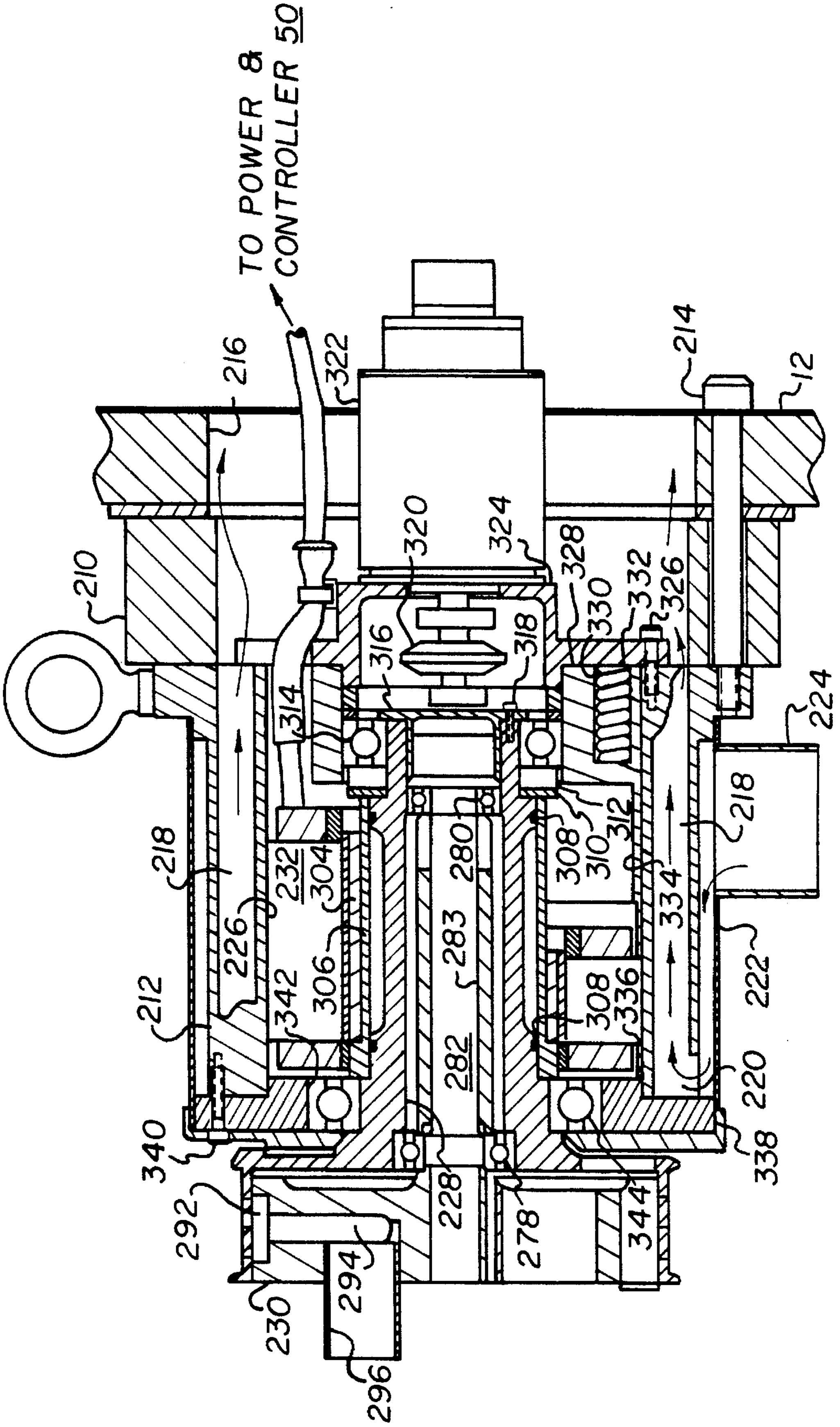
FIG. 17 shows a sectional view of the high performance vacuum drum, some parts being rotated into the plane of view for ease of illustration, taken along line 17—17 of FIG. 23.

In front of encoder housing 324, a rigid, annular compression plate 328 comprises a plurality of backwardly opening, circumferentially spaced pockets 330, only one of which is visible in FIG. 17. Each pocket retains a compression spring 332 which is engaged by the front face of encoder housing 324. Springs 332 provide the frictional force necessary to prevent the motor armature from rotating and also compensate for thermal expansion. Compression plate 328 thus is forced into contact with the first of one or more cylindrical spacers 334, the front one of which bears against the back side of the armature of motor 232. The front side of the armature bears against a further cylindrical spacer 336 which contacts a front bearing pilot ring 338 mounted to the front end of motor housing 212 by suitable fasteners such as bolts 340. A pilot bore 342 within ring 338 mounts a front bearing 344 which is supported on front bearing surface 238 of vacuum drum rotor 228. By changing the axial lengths of cylindrical spacers 334, 336, servo motors of different lengths and rated torques can be accommodated without a major redesign, as indicated by the upper, longer motor and the lower, shorter motor shown schematically in FIG. 17.

In operation, web 14 moves from track plate 92 of perforator apparatus 30 and engages vacuum drum 32 in the manner shown in FIG. 23. The total wrap of web 14 around vacuum drum shell 260 can be any angle, but preferably is about 135 degrees; so that, the web does not wrap completely around recesses 288, 298 of stator manifold 284. The minimum angle of wrap is limited by the smallest recess 292 which can be used to reliably control and index web 14; whereas, the maximum angle of wrap is limited by the need to avoid interference of the incoming and outgoing spans of web. When web 14 initially engages shell 260 tangentially during a rapid index, air adjacent the web is entrained and would become trapped under the web at the nip area where the web meets the surface of shell 260. However, this entrapped air is vented to atmosphere through grooves 264, 266 and holes 268 into recess 288 over a wrap arc of about 37 degrees. Over this same wrap arc, web 14 also is free to position itself transversely between edge flanges 262. Over the next wrap arc of about 90 degrees, subatmospheric pressure is applied through connector 296, passage 294 and recess 292 to grooves 264, 266 and holes 268, thereby removing any remaining entrained air and holding web 14 securely to vacuum drum 32 during the index. Over the final wrap arc of about 13 degrees, recess 298 either is vented to atmosphere or supplied with pressurized air through port 300 to ease departure of web 14 from the surface of shell 260.

A wide variety of web transport systems requiring accurate repeatability of indexes at high accelerations can be provided with a vacuum drum of the type shown in FIGS. 17 to 23. The index distance or number of revolutions of the drum during an index can be fractional or any number desired, simply by programming the operation of servo motor 232, which also permits changing the number of revolutions from index to index.

Typical Cycle of Operation

Figure 24:
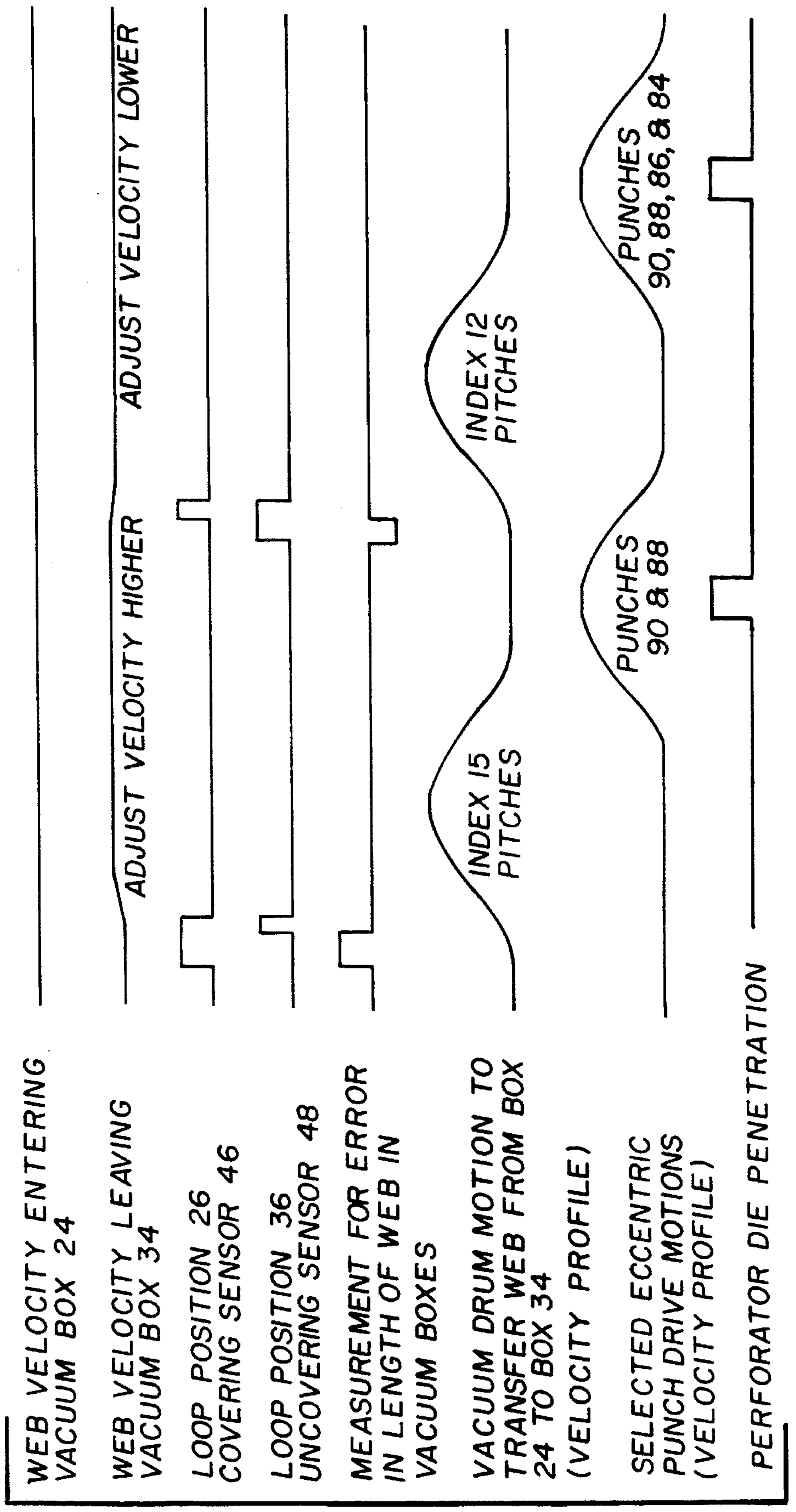
FIG. 24 shows a timing or operating cycle chart for a cycle of operation of the apparatus of the invention.

Suppose that web 14 is photographic film which is to be perforated with successive patterns of perforations each having a leader portion 60, a feature perforation 66, twenty single perforations 64 to identify twenty frames to be exposed and a trailer portion 62, in the general manner shown in FIG. 4. Assume leader portion 60 and trailer portion 62 combined are seven pitches long, one pitch being the space between perforations 64. Assume that web 14 is stopped within perforator apparatus 30, which has just completed a preceding pattern. A typical cycle of operation to provide the next non-continuous pattern of perforations would be governed by controller 50 in accordance with a program of the type illustrated by the timing chart of FIG. 24.

To enable controller 50 to determine the necessary angular velocities of stock rolls 16 and 44 to maintain essentially constant web speed, conventional sensors, not illustrated, may be provided to measure the diameter of the material wound onto the rolls at start up and during operation. Alternatively, idler rollers 18, 38 may be provided with encoders to monitor the length of material passing over a period of time, which can then be used with a measured angular displacement of stock rolls 16 and 44 to determine the diameters of the stock rolls. Once the start up diameters are known, controller 50 can readily accelerate the system to operating speed. During such an alternative start up, the infeed loop 26 would initially be placed at the level of a photocell detector 46*a* and the outfeed loop 36 would be placed at a photocell 48*b*. See FIG. 2.

A cycle of operation then would proceed in the following manner. Web 14 is supplied to vacuum box 24 and removed from vacuum box 34 at a substantially constant and equal rate. When loop 26 covers sensor 46 and loop 36 uncovers sensor 48, vacuum drum 32 indexes to advance web 14 from vacuum box 24 through perforating apparatus 30 to vacuum box 34. At the same time, appropriately selected punch drive motors 168 are started on a coordinated motion trajectory that will cause the corresponding punches 152 to pass through and retract from web 14 after web 14 has settled to a stop at the end of the vacuum drum motion.

The average rate of incoming and outgoing web must be matched well enough to prevent accumulation of error from causing the vacuum boxes to be filled beyond capacity or completely emptied. This may be done by monitoring the sequence and time interval between movement of loop 26 past sensor 46 during downward travel as web 14 enters the apparatus, and movement of loop 36 past sensor 48 during upward travel as web 14 leaves the apparatus. Given that the nominal web velocity is known and that the desired length of web 14 within the apparatus should cause both sensors 46 and 48 to respond simultaneously to passage of loops 26 and 36, the error in length of web present can be calculated by controller 50. This error can then be used to control adjustments in the incoming or outgoing web velocity in order to regain the desired nominal operating condition.

During the initial index of the apparatus, web 14 is moved a distance of fifteen pitches. That is, eight pitches from the preceding cycle plus seven pitches for leader/trailer, which places the last perforation 64 seven pitches away from the right-most punch element 152 in punch 78, 88. Then punches 76, 86 and 78, 88 are actuated to form the first eight perforations 64 of the current cycle. During the next index, web 14 is moved twelve more pitches to place the first perforation 64, produced by the left most punch element 152 in punch 76, 86, one pitch to the right of the right most punch element in punch 80, 90. All four punches are then actuated to produce the remaining twelve perforations 64, plus special feature perforations 66. This process then repeats for subsequent strips.

In the event that the apparatus of the invention would be used to supply perforated strip to an intermittently operated spooler for twenty frame strips of web material, rather than to rewind stock roll 44, those skilled in the art would understand that feature punch 74, 84 would be moved to the right end of perforator apparatus 30, as viewed in FIG. 5. In such an arrangement, during the initial index of the apparatus, all four punches would be actuated to produce twelve perforations 64, plus feature perforations 66. Web 14 would then be moved twelve pitches to position the perforation previously formed by the left-most punch element 152 of punch 76, 86, one pitch to the right of the right-most punch element of punch 80, 90. Then punches 78, 88 and 80, 90 would be actuated to punch the final eight perforations of a twenty frame strip. During the next index to position web 14 for a new strip, vacuum drum 32 would index the web fifteen pitches (eight pitches plus seven pitches for the leader and trailer portions).

Technical Advantages of the Invention

The apparatus and method of the invention permit accurate, high speed indexing of a web of material through a processing station such as a perforator apparatus and the application of patterns of widely spaced perforations and leader/trailer portions to such a web during brief dwell times between indexes of the web.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for perforating an elongated strip of material, said strip having a width, comprising:

- an elongated, flat track plate having side edges and a first upper surface;
- a plurality of gas flow apertures arranged along said track plate, each said aperture being extended through and angled relative to said first upper surface, whereby gas flowing through said apertures will support said strip above said first upper surface;
- means for directing pressurized gas through said apertures;
- means for intermittently moving said strip in said direction of movement along said track;
- at least one pair of edge guide means spaced apart greater than said width on either side of said track plate for guiding said strip along said track plate;
- means positioned along said track for perforating said strip when said strip is stopped by said means for intermittently moving; and
- means extended transverse to said track plate and past said edge guide means for restraining movement of said strip away from said track plate during operation of said means for perforating.

2. Apparatus according to claim 1, wherein said apertures are arranged in at least one row along said track plate so as to be essentially at the center of said strip, some of said apertures being angled toward one of said side edges and others of said apertures being angled toward the other of said side edges.

3. Apparatus according to claim 1, wherein said means for perforating comprises at least one fixed die having a second upper surface substantially coplanar with said first upper surface, said fixed die being positioned along one of said side edges and having a plurality of die apertures spaced along said track plate opposite said strip; a plurality of punches aligned with said die apertures; and means for moving one or a selected number of said punches through said strip and into said die apertures, thereby perforating said strip.

4. Apparatus according to claim 3, wherein said means for restraining comprises a plurality of apertures for passage of said punches.

5. Apparatus according to claim 4, wherein said edge guide means comprises a recess adjacent each of said plurality of die apertures; and said second upper surface of said fixed die extends into said recess.

6. Apparatus according to claim 4, further comprising gas passage means, opening through each of said edge guide means, for permitting escape of gas flowing beneath said strip from said gas flow apertures.

7. Apparatus according to claim 6, wherein said strip has edges and said gas passage means opens toward said edges beneath said means for restraining movement.

8. Apparatus according to claim 7, wherein said gas passage means also opens beneath said fixed die to permit removal of debris resulting from said perforating.

9. Apparatus according to claim 1, further comprising gas passage means for permitting escape of gas flowing beneath said strip from said gas flow apertures.

10. Apparatus according to claim 9, wherein said strip has edges and said gas passage means opens toward said edges.

11. Apparatus according to claim 10, wherein said gas passage means opens beneath said means for perforating to permit removal of debris resulting from said perforating.

12. Apparatus according to claim 1, wherein said means for intermittently moving comprises a vacuum drum assembly positioned at the downstream end of said track plate in said direction of movement of said strip and means for intermittently rotating said drum to move said strip along said track plate, said drum assembly comprising:

- a frame;
- a rotor shaft mounted for rotation in said frame;
- a circular cylindrical shell having an interior surface and an exterior surface and a pattern of apertures extending from said interior surface to said exterior surface, said shell being mounted on one end of said rotor shaft and positioned to permit said strip to wrap around said exterior surface through a wrap angle;
- a stationary pneumatic manifold positioned within said shell, said manifold having a first plenum open to atmospheric pressure and extended over a first arcuate sector at an upstream portion of said wrap angle, a second plenum connected to a vacuum source and extended over a second arcuate sector at a mid-portion of said wrap angle and a third plenum open to at least atmospheric pressure and extended over a third arcuate sector at a downstream portion of said wrap angle, said sectors communicating sequentially with a portion of said apertures;
- a magnetic rotor assembly mounted on said shaft; and
- a magnetic stator assembly mounted in said frame surrounding said rotor assembly.

13. Apparatus according to claim 12, wherein said rotor shaft is hollow and said manifold comprises a stator shaft supported by bearings mounted within said rotor shaft, further comprising means for fixing said manifold relative to said frame.

14. Apparatus according to claim 1, wherein said means for intermittently moving comprises:

a vacuum drum assembly positioned at the downstream end of said track plate in said direction of movement of said strip;

means for intermittently rotating said drum to move said strip along said track plate; and means for measuring rotation of said drum, further comprising means for controlling operation of said means for perforating in response to said means for measuring.

15. Apparatus according to claim 14, wherein said means for intermittently moving further comprises:

a first vacuum box positioned at the upstream end of said track plate for receiving a first loop of said strip and maintaining tension on said strip;

means for detecting a maximum desired size of said first loop in said first vacuum box and sending a signal to said means for controlling operation;

a second vacuum box positioned at the downstream end of said drum for receiving a second loop of said strip and maintaining tension on said strip;

means for detecting a minimum desired size of said second loop in said second vacuum box and sending a signal to said means for controlling operation; and wherein said means for controlling operation starts rotation of said drum when said maximum desired size and said minimum desired size are detected.

16. Apparatus according to claim 15, further comprising conduit means interconnecting the low pressure sides of said first and second vacuum boxes for maintaining essentially the same pressure in both vacuum boxes.

17. Apparatus according to claim 14, wherein said means for intermittently moving further comprises:

a first vacuum box positioned at the upstream end of said track plate for receiving a first loop of said strip and maintaining tension on said strip;

a second vacuum box positioned at the downstream end of said drum for receiving a second loop of said strip and maintaining tension on said strip; and conduit means interconnecting the low pressure sides of said first and second vacuum boxes for maintaining essentially the same pressure in both vacuum boxes, whereby the low pressure volume between said boxes remains essentially constant.

18. Apparatus for perforating an elongated strip of material, comprising:

an elongated, flat track plate having side edges and a first upper surface;

means for intermittently moving said strip in a direction along said track plate comprising a vacuum drum assembly positioned at the downstream end of said track plate in said direction; means for intermittently rotating said drum to move said strip along said track plate; means for measuring rotation of said drum; a first vacuum box positioned at the upstream end of said track plate for receiving a first loop of said strip and maintaining tension on said strip; a second vacuum box positioned at the downstream end of said vacuum drum for receiving a second loop of said strip and maintaining tension on said strip; and conduit means interconnecting the low pressure sides of said first and second vacuum boxes for maintaining essentially the same pressure in both vacuum boxes;

means positioned along said track plate for perforating said strip when said strip is stopped by said means for intermittently moving; and means for controlling operation of said means for perforating in response to said means for measuring.

19. Apparatus according to claim 18, wherein said strip has a width, further comprising at least one pair of edge guide means spaced apart greater than said width on either side of said track plate for guiding said strip along said track plate; and means extended transverse to said track plate and past said edge guide means for restraining movement of said strip away from said track plate during operation of said means for perforating.

20. Apparatus according to claim 18, wherein said means for perforating comprises at least one fixed die having a second upper surface substantially coplanar with said first upper surface, said fixed die being positioned along one of said side edges and having a plurality of die apertures spaced along said track plate opposite said strip; a plurality of punches aligned with said die apertures; and means for moving one or a selected number of said punches through said strip and into said die apertures, thereby perforating said strip.

21. Apparatus according to claim 20, wherein said strip has a width, further comprising at least one pair of edge guide means, spaced apart greater than said width outside said track plate and said fixed die, for guiding said strip along said track plate and opposite said fixed die; and means extended transverse to said track plate and past said edge guide means and said fixed die for restraining movement of said strip away from said track plate during operation of said means perforating, said means for restraining comprising a plurality of apertures for passage of said punches.

22. Apparatus according to claim 21, wherein said edge guide means comprises a recess adjacent each of said plurality of die apertures; and said second upper surface of said fixed die extends into said recess.

23. Apparatus according to claim 18, wherein said drum assembly comprises:

a frame;

a rotor shaft mounted for rotation in said frame;

a circular cylindrical shell having an interior surface and an exterior surface and a pattern of apertures extending from said interior surface to said exterior surface, said shell being mounted on one end of said rotor shaft and positioned to permit said strip to wrap around said exterior surface through a wrap angle;

a stationary pneumatic manifold positioned within said shell, said manifold having a first plenum open to atmospheric pressure and extended over a first arcuate sector at an upstream portion of said wrap angle, a second plenum connected to a vacuum source and extended over a second arcuate sector at a mid-portion of said wrap angle and a third plenum open to at least atmospheric pressure and extended over a third arcuate sector at a downstream portion of said wrap angle, said sectors communicating sequentially with a portion of said apertures;

a magnetic rotor assembly mounted on said shaft; and a magnetic stator assembly mounted in said frame surrounding said rotor assembly.

24. Apparatus according to claim 23, wherein said rotor shaft is hollow and said manifold comprises a stator shaft supported by bearings mounted within said rotor shaft, further comprising means for fixing said manifold relative to said frame.

25. Apparatus according to claim 18, wherein said means for intermittently moving further comprises:

means for detecting a maximum desired size of said first loop in said first vacuum box and sending a signal to said means for controlling operation;

means for detecting a minimum desired size of said second loop in said second vacuum box and sending a signal to said means for controlling operation;

wherein said means for controlling operation starts rotation of said drum when said maximum desired size and said minimum desired size are detected.

26. An improved die apparatus for use in perforating elongated strips of material, said strips having edges and a width, said apparatus comprising:

an elongated, flat track plate having side edges and a first upper surface;

a plurality of gas flow apertures arranged along said track plate, each said aperture being extended through and angled relative to said first upper surface, whereby gas flowing through said apertures will support said strip above said first upper surface;

at least one fixed die having a second upper surface substantially coplanar with said first upper surface, said fixed die being positioned along one of said side edges and having a plurality of die apertures spaced along said track plate opposite said strip;

at least one pair of edge guide means, spaced apart greater than said width outside said track plate and said fixed die, for guiding said strip along said track plate and opposite said fixed die; and gas passage means, opening through each of said edge guide means, for permitting escape of gas flowing beneath said strip from said gas flow apertures.

27. Apparatus according to claim 26, further comprising means extended transverse to said track plate and past said edge guide means and said fixed die for restraining movement of said strip away from said track plate during use of said apparatus, said means for restraining comprising a plurality of apertures for passage of punches to said fixed die.

28. Apparatus according to claim 27, wherein said gas passage means opens toward said edges of said strip beneath said means for restraining movement.

29. Apparatus according to claim 28, wherein said gas passage means also opens beneath said fixed die to permit removal of debris from said perforating.

30. A method for providing an elongated strip of material with a selectable length pattern of perforations along the length of said strip, comprising the steps of:

(a) positioning said strip on an elongated track;

(b) providing a plurality of punch and die sets along said track in position to perforate said strip;

(c) actuating a first fraction of said plurality of punch and die sets to produce a first portion of said pattern of perforations;

(d) moving said strip longitudinally along said track to permit production of a subsequent portion of said pattern of perforations, said subsequent portion being spaced longitudinally along said strip from said first portion;

(e) again actuating said first fraction or actuating a different fraction or actuating all of said plurality of punch and die sets to produce said subsequent portion of said pattern of perforations;

(f) repeating steps (d) and (e) until said pattern of perforations is completed; and (g) moving said strip longitudinally along said track to permit production of a subsequent pattern of perforations.

31. A method for providing an elongated strip of material with a selectable length pattern of perforations along the length of said strip, comprising the steps of:

(a) positioning said strip on an elongated track;

(b) providing a plurality of punch and die sets along said track in position to perforate said strip;

(c) actuating all of said plurality of punch and die sets to produce a first portion of said pattern of perforations;

(d) moving said strip longitudinally along said track to permit production of a subsequent portion of said pattern of perforations, said subsequent portion being spaced longitudinally along said strip from said first portion;

(e) actuating all or actuating a fraction of said plurality of punch and die sets to produce said subsequent portion of said pattern of perforations;

(f) repeating steps (d) and (e) until said pattern of perforations is completed; and (g) moving said strip longitudinally along said track to permit production of a subsequent pattern of perforations.

* * * * *

UNITED STATES PATENT AND TRADEMARK OFFICE
CERTIFICATE OF CORRECTION

PATENT NO. : 5,461,450

DATED : October 24, 1995

INVENTOR(S) : Michael Long et al.

It is certified that error appears in the above-identified patent and that said Letters Patent is hereby corrected as shown below:

Title page, item [54] and col. 1, line 3, "ENLONGATED" should be --ELONGATED--.

Signed and Sealed this

Twenty-fifth Day of March, 1997

Attest:

Bruce Lehman

BRUCE LEHMAN

*Attesting Officer*

*Commissioner of Patents and Trademarks*